United States Patent [19]

Athnasios et al.

[11] Patent Number: 5,091,117
[45] Date of Patent: Feb. 25, 1992

[54] PROCESS FOR THE REMOVAL OF STEROL COMPOUNDS AND SATURATED FATTY ACIDS

[75] Inventors: Albert K. Athnasios, Madison; Gareth J. Templeman, Sparta, both of N.J.

[73] Assignee: Nabisco Brands, Inc., Parsippany, N.J.

[21] Appl. No.: 509,230

[22] Filed: Apr. 16, 1990

[51] Int. Cl.$^5$ .............................................. C11B 3/10
[52] U.S. Cl. ............................... 260/428; 260/428.5; 426/417
[58] Field of Search ................. 260/428.5, 428, 425, 260/412.5; 426/417

[56] References Cited

U.S. PATENT DOCUMENTS

| | | | |
|---|---|---|---|
| 3,527,712 | 9/1970 | Renn et al. | 252/316 |
| 3,814,255 | 6/1974 | Smernoff | 210/31 |
| 3,817,706 | 6/1974 | Smith | 23/230 |
| 3,997,298 | 12/1976 | McLafferty et al. | 23/253 |
| 4,076,930 | 2/1978 | Ellingboe | 536/1 |
| 4,156,688 | 5/1979 | Zosel | 260/420 |
| 4,297,220 | 10/1981 | Meitzner et al. | 216/690 |
| 4,324,840 | 4/1982 | Katz | 426/423 |
| 4,331,694 | 5/1982 | Izod | 426/422 |
| 4,339,959 | 6/1982 | Bracco | 426/614 |
| 4,431,544 | 2/1984 | Atkinson et al. | 210/635 |
| 4,454,056 | 6/1984 | Kittelmann et al. | 502/62 |
| 4,491,609 | 1/1985 | Degel et al. | 427/215 |
| 4,544,485 | 10/1985 | Pinkerton et al. | 210/500.1 |
| 4,637,861 | 1/1987 | Krull et al. | 436/501 |
| 4,665,110 | 5/1987 | Zones | 502/62 |
| 4,681,870 | 7/1987 | Balint et al. | 210/691 |
| 4,692,280 | 9/1987 | Spinelli et al. | 260/420 |
| 4,874,629 | 10/1989 | Chang et al. | 406/601 |
| 4,921,831 | 5/1990 | Nakai et al. | 502/418 |
| 5,024,846 | 6/1991 | McLachlan et al. | 426/312 |
| 5,026,565 | 6/1991 | McLachlan et al. | 426/241 |

FOREIGN PATENT DOCUMENTS

| | | | |
|---|---|---|---|
| 0318326 | 5/1989 | European Pat. Off. | 260/428.5 |
| 2601959 | 5/1988 | France . | |
| 0039991 | 2/1988 | Japan | 260/428.5 |
| WO8802989 | 10/1988 | PCT Int'l Appl. . | |
| 0816958 | 4/1981 | U.S.S.R. | 502/16 |

OTHER PUBLICATIONS

Chemical Abstracts, 108, 112,170k and 150,453n, Yamamura et al., Guest Selective Molecular Recognition by an Octadecylsilyl Monolayer Covalently Bound on an $SnO_2$ Electrode, J. Chem. Commun., 1988, 79–81.
Chemical Abstracts, 108, 127,097r, Swientek, Supercritical fluid extraction separates components in foods Food Processing 48(7), 32, 34, 36 (1987).
Food Science and Technology Abstracts, 19(6), Abstract 6 G 29 (1987).
Food Science and Technology Abstracts, 19(12), Abstract 12 H 200 (1987).
Food Science and Technology Abstracts, 20(2), Abstract 2 E 35 (1988).
Food Science and Technology Abstracts, 20(3), Abstract 3 N 31 (1988).
Food Science and Technology Abstracts, 20(4), Abstract 4 E 36 (1988).
Food Science and Technology Abstracts, 20(5), Abstract 5 T 57 (1988).
Food Science and Technology Abstracts, 20(6), Abstract 6 V 143 (1988).

(List continued on next page.)

*Primary Examiner*—José G. Dees
*Assistant Examiner*—Deborah D. Carr

[57] ABSTRACT

Sterol compounds, especially cholesterol, are removed from fluid mixtures by contacting the mixture with charcoal which has been activated by heating to at least 110° C., and preferably about 130° C., in a stream of an oxygen-containing gas, which can be air. More than 90 percent of the sterol compounds present in the fluid mixture can be removed. The charcoal also removes part of the saturated fatty acids (especially stearic acid), but does not remove a substantial proportion of any unsaturated fatty acids which may be present in the mixture. The process is especially useful for the removal of cholesterol and reduction of stearic acid from butter oil, which contains large amounts of both materials.

43 Claims, 1 Drawing Sheet

OTHER PUBLICATIONS

Food Science and Technology Abstracts, 20(7), Abstract 7 N 60 (1988).
Food Science and Technology Abstracts, 6, Abstract 8 A 374 (1974).
Food Science and Technology Abstracts, 18(1), Abstract 1 H 46 (1986).
Food Science and Technology Abstracts, 18(2), Abstract 2 M 118 (1986).
Food Science and Technology Abstracts, 18(3), Abstract 3 T 70 (1986).
Food Science and Technology Abstracts, 18(8), Abstract 8 V 321 (1986).
Food Science and Technology Abstracts, 19(3), Abstract 3 V 102 (1987).
Food Science and Technology Abstracts, 19(4), Abstract 4 E 11 (1987).
Food Science and Technology Abstracts, 19(4), Abstract 4 N 36 (1987).
Geyer et al. "Filipin—A Histochemical Fluorochrome for Cholesterol", Acta Histochem [Suppl] (Jena), 15, 207-212 (1975).
Bittman et al, "Determination of Cholesterol Asymmetry by Rapid Kinetics of Filipin-Cholesterol Association: Effect of Modification in Lipids and Proteins", Biochemistry 20(9), 2425-2432 (1981).
Behnke et al. "Filipin as a Cholesterol Probe II, Filipin Cholesterol Interaction in Red Blood Cell Membranes", Eur. J. Cell. Biol., 35(2) 200-215 (1984).
Lok et al., "The role of organic molecules in molecular sieve synthesis", Zeolites, 3, 282 (1983).
Lehn, "Supramolecular Chemistry: receptors, catalysts and carriers", Science, 227, 849 (1985).
Wehr, "Sample preparation and column regeneration in biopolymer separation", J. Chrom. 418, 27 (1987).
Evershed et al. "Strategy for the analysis of steryl esters from plant and animal tissues", J. Chrom. 400 187 (1987).
Takase et al. "Characterization of Sterol Carrier Protein Binding with 7-Dehydrocholesterol and Vitamin D", J. Nutr. Sci. Vitaminol. 23, 53-61 (1977).
LeFevre et al. "Adrenal Cholesterol-Binding Protein: Properties and Partial Purification", Febs. Letters, 89(2), 287-292 (1978).
Higuchi et al. "Comparative Studies on a Heat Stable Cholesterol-Binding Protein in Dental Cyst Fluid and Serum", Int. J. Biochem., 13 777-782 (1981).
Chen et al "Prostate Protein Isolation and Characterization of the Polypeptide Components and Cholesterol Binding" J. Biol. Chem. 257(1), 116-121 (1982).
Sziegoleit, "Purification and Characterization of a Cholesterol-Binding Protein from Human Pancreas," Biochem. J., 207, 573-582 (1982).
Regenass-Klotz et al., "Specific Binding of cholesterol to Chromatin Prepared from Mouse Spleen Cells", Can. J. Biochem. Cell Biol., 62, 94-99 (1984).
Bornig et al. "Staining of Cholesterol with the Fluorescent Antibiotic Filipin", Acta Histochem., 50, 110-115 (1974).
Patterson, "Effects of Experimental Conditions on the Interaction of Filipin and Pimaricin with Cholesterol", Antibiot. (Tokyo), 32(11) 1193-2000 (1979).
"Sephadex Column Chromatography as an Adjunct to Competitive Protein Binding Assays of Steroids," Nature New Biology, 232, 21-24 (Jul. 1971).
"Evaluation of a High-Performance Liquid Chromatography Method for Isolation and Quantitation of Cholesterol and Cholesterol Ester," Carroll et al., J. Lipid Res, 22(2), 359-363 (Feb. 1981).
"The Role of a Carrier Protein in Cholesterol and Steroid Hormone Synthesis by Adrenal Enzymes 1, 2," Kan et al., Biochemical and Biophysical Research Communications, 48(2), 423-429 (1972).
Food Science and Technology Abstracts, 20(8), Abstract 8 E 4 (1988).
Food Science and Technology Abstracts, 20(8), Abstract 8 N 26 (1988).
Food Science and Technology Abstracts, 20(12), Abstract 12 N 16 (1988).
Food Science and Technology Abstracts, 20(11), Abstract 11 V 36 (1988).
Deutsch et al., "Isolation of Lipids from plasma by Affinity Chromatography", Biochemical and Biophysical Research Communications, 50(3), 758-764 (1973).
"Affinity Chromatography," Parikh et al. Chemical & Engineering News, Aug. 26, 1985, pp. 17-32.

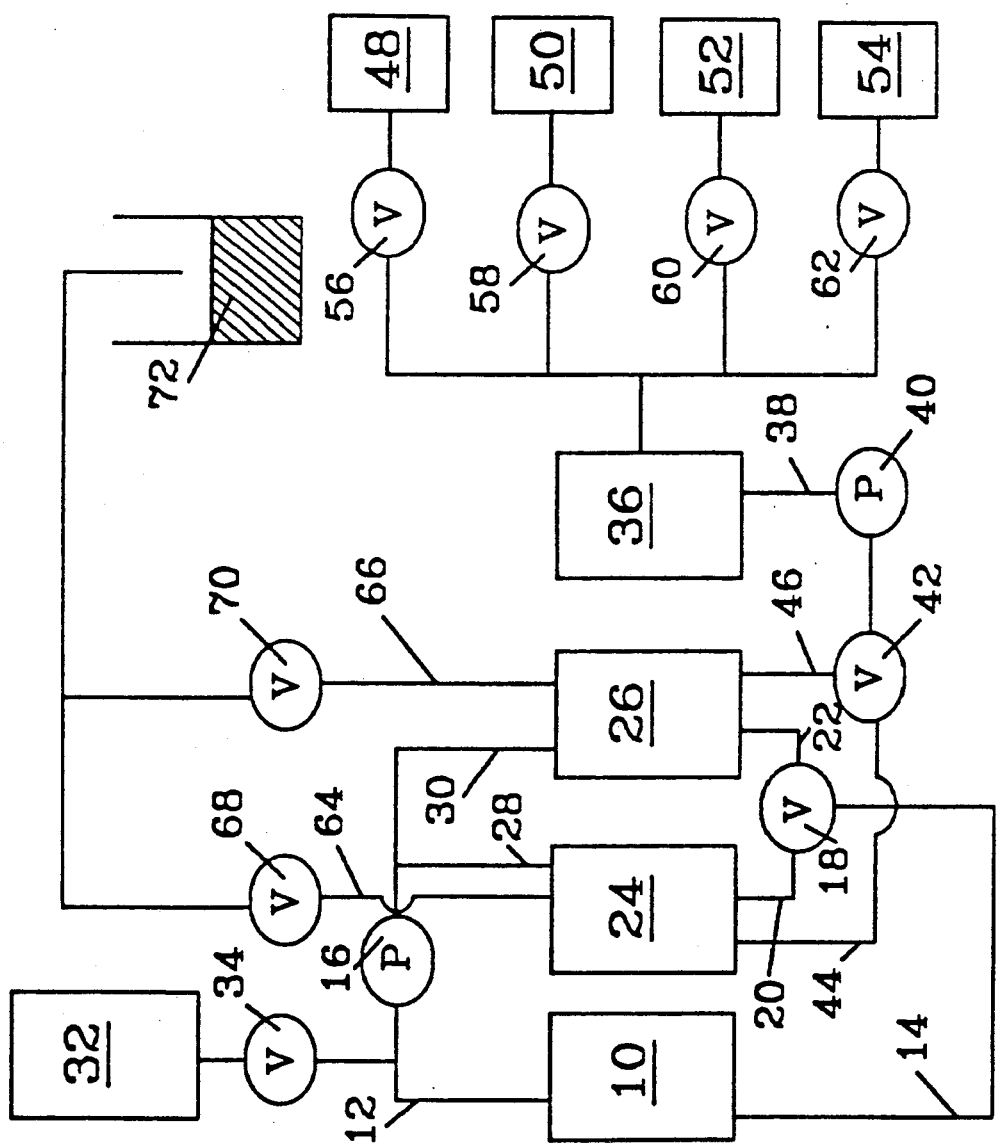
Figure

PROCESS FOR THE REMOVAL OF STEROL COMPOUNDS AND SATURATED FATTY ACIDS

FIELD OF THE INVENTION

This invention relates to processes for the removal of sterol compounds (a term which is used herein to refer to cholesterol and its derivatives, metabolites and enzymatic degradation products, and also includes plant sterols and the oxidized forms of such plant sterols), and saturated fatty acids, especially stearic acid, from fluid mixtures. The process is especially, though not exclusively, useful for the separation of sterol compounds and saturated fatty acids from foodstuffs such as butter oil, which contain large quantities of both these materials. The process is also useful for treatment of fish oils, which also contain substantial quantities of unsaturated fatty acids, and when so used has the advantage of not removing substantial amounts of the desirable unsaturated fatty acids. The process may also be used to separate sterol compounds from egg yolk oil, butter oil, lard, tallow and other fatty materials.

BACKGROUND OF THE INVENTION

Cholesterol and other sterols are natural constituents of many foodstuffs. However, the presence of large amounts of cholesterol and other sterols in the human body is considered by physicians to be deleterious, since cholesterol has been implicated as a factor in a number of diseases, especially atherosclerosis, in which deposits containing a high proportion of cholesterol are deposited in blood vessels. Accordingly, it is common practice for physicians to recommend to patients who have suffered a heart attack, or who display a likelihood of, or documented, hypercholesterolemia, that the patients reduce their cholesterol intake from foodstuffs.

However, cholesterol is found in significant quantities in a wide variety of foodstuffs, being present in most animal fats, and consequently restrictions upon the cholesterol intake of patients necessitate prohibiting or greatly reducing the consumption of many foodstuffs, a step which many patients are reluctant to take, and which may introduce complications in ensuring that the patients receive a properly balanced diet meeting all nutritional requirements. Finally, the public has recently become increasingly aware of the health risks associated with consumption of cholesterol, so that even persons who are not under medical treatment for conditions in which cholesterol is implicated are voluntarily attempting to reduce their cholesterol consumption, and the food industry is beginning to label foods to show their cholesterol content. Thus, many people may avoid foods known to be high in cholesterol and seek substitutes.

In order to help people to reduce their cholesterol consumption without major modifications in their diet (and thus help to ensure, inter alia, that people who must follow a low cholesterol diet for medical reasons do in fact keep to such a diet), it is desirable to provide some method by which cholesterol and other sterol compounds (many of which can be metabolized to cholesterol or its derivatives) can be extracted from various foodstuffs, thereby producing low-cholesterol versions of such foodstuffs which can be consumed in place of the original, high-cholesterol foodstuffs. However, the requirements for such a sterol-removal process are exacting. The process must not, of course, introduce into the foodstuff any material which is not generally recognized as safe for use in foodstuffs. The process should remove from the foodstuff not only cholesterol itself but also cholesterol derivatives and other sterol compounds which can be metabolized in the body to cholesterol or derivatives thereof, and which thus affect cholesterol levels in the body. Furthermore, the process should leave the foodstuff in a form which is as close as possible to that of the original, high-cholesterol foodstuff. Finally, the cholesterol-removal process should preserve the nutritional value of the foodstuff, and not, for example, remove vitamins and other important constituents of the foodstuff. In particular, since cholesterol is frequently present in foodstuffs in the form of various complexes, it is desirable that a cholesterol-removal process not remove the other natural materials found to be associated with the cholesterol.

Numerous attempts have previously been made to provide a cholesterol-removal process which meets these exacting criteria. For example, attempts have been made to remove cholesterol, and other undesirable food components, by extracting the cholesterol from the foodstuff with supercritical carbon dioxide. Such carbon dioxide extraction processes suffer from the disadvantage that they must be operated under pressure to keep the carbon dioxide in the supercritical phase, which increases the cost of the apparatus required. In addition, such carbon dioxide extraction processes may not be very selective in removing cholesterol, and thus may remove valuable constituents of the foodstuff. In addition, the properties of some foodstuffs may be altered disadvantageously by contact with supercritical carbon dioxide; for example, in some cases the carbon dioxide may remove flavoring and/or odiferous components, thereby affecting the taste and/or smell of the treated foodstuff.

For example, U.S. Pat. No. 4,692,280, issued Sept. 8, 1987, to Spinelli et al., describes a process for the purification of fish oils in which the oil is extracted with supercritical carbon dioxide to remove cholesterol, together with odoriferous and volatile impurities.

Food Science and Technology Abstracts, 6, Abstract 8 A 374 (1974) (Abstract of Food Technology 28(6), 32-34, 36, 38 (1974)) describes a pilot plant for extraction of volatile substances from liquid and solid foods using supercritical carbon dioxide as the solvent.

Food Science and Technology Abstracts, 18(1), Abstract 1 H 46 (1986) (Abstract of German Offenlegungsschrift 33 31 906 (1985)) describes extraction of caffeine from coffee beans using supercritical carbon dioxide as the solvent.

Food Science and Technology Abstracts, 18(2), Abstract 2 M 118 (1986) (Abstract of Agricultural and Biological Chemistry, 49(8), 2367-72 (1985)) describes extraction of oils from wheat germ using supercritical carbon dioxide as the solvent.

Food Science and Technology Abstracts, 18(3), Abstract 3 T 70 (1986) (Abstract of Indian Food Industry, 3(2), 48-51 (1084)) describes extraction of flavor components from natural products using supercritical carbon dioxide.

Food Science and Technology Abstracts, 18(8), Abstract 8 V 321 (1986) (Abstract of French Patent Application Publication No. 2,563,702 (1985)) describes extraction of essential oils from blackcurrant buds using supercritical carbon dioxide.

Food Science and Technology Abstracts, 19(3), Abstract 3 V 102 (1987) (Abstract of United Kingdom Patent Application Publication No. 2,173,985 (1986)) describes extraction of aroma materials from dried plant material, which has been milled and soaked in ethanol, using a continuously flowing stream of carbon dioxide at a temperature below its critical temperature. The plant material can be used for extraction of tannin, caffeine and nicotine from tea, coffee and tobacco respectively.

Food Science and Technology Abstracts, 19(4), Abstract 4 E 11 (1987) (Abstract of Food Manufacture, 61(12), 58 (1986)) describes the use of supercritical or high pressure carbon dioxide in various processes, including decaffeination of coffee, preparation of hop extract for brewing, extraction of essential oils, defatting of potato chips, and fractionation of fish oils.

Food Science and Technology Abstracts, 19(4), Abstract 4 N 36 (1987) (Abstract of Seafood Export Journal 18(9), 10–13 (1986)) describes extraction of oils from Antarctic krill using supercritical carbon dioxide.

Food Science and Technology Abstracts, 19(6), Abstract 6 G 29 (1987) (Abstract of Nahrung 30(7), 667–671 (1986)) describes defatting of baker's yeast protein extracts by extraction with supercritical carbon dioxide.

Food Science and Technology Abstracts, 19(12), Abstract 12 H 200 (1987) (Abstract of Journal of Food Science and Technology 23(6), 326–328 (1986)) describes decaffeination of coffee using supercritical carbon dioxide as solvent.

Food Science and Technology Abstracts, 20(2), Abstract 2 E 35 (1988) (Abstract of Voedingsmiddelentechnologie 20(7), 32-35 (1987)) describes various uses of extraction with supercritical carbon dioxide in the food industry, including extraction of oils and fats, preparation of hop extracts, fractionation of oils and fats, extraction of essential oils, and elimination of undesirable constituents, for example decaffeination of coffee.

Food Science and Technology Abstracts, 20(3), Abstract 3 N 31 (1988) (Abstract of Agricultural and Biological Chemistry, 51(7), 1773-77 (1987)) describes fractional extraction of rice bran oil with supercritical carbon dioxide.

Food Science and Technology Abstracts, 20(4), Abstract 4 E 36 (1988) (Abstract of Food Trade Review 57(9), 461, 463–464 (1987)) describes the use of supercritical carbon dioxide as an extractant of vegetable oils.

Swientek, Supercritical fluid extraction separates components in foods, Food Processing 48(7), 32, 34, 36 (1987)) describes the use of supercritical fluid extraction in the food industry, including removal of cholesterol from milkfat, extraction of omega-3-fatty acids from fish oil, and extraction of oil seeds.

Food Science and Technology Abstracts, 20(5), Abstract 5 T 58 (1988) (Abstract of Sciences des Aliments 7(3), 481–498 (IgB7)) describes the preparation of a black pepper oleoresin by extraction of the pepper with supercritical carbon dioxide or with a carbon dioxide/ethanol blend.

Food Science and Technology Abstracts, 20(6), Abstract 5 T 58 (1988) (Abstract of West German Patentschrift 30 11 185 (1988)) describes the purification of lecithin for food or pharmaceutical use by extraction with supercritical carbon dioxide.

Food Science and Technology Abstracts, 20(7), Abstract 7 N 60 (1988) (Abstract of Journal of the American Oil Chemists' Society 65(1), 109–117 (1988)) describes fractionation of menhaden oil ethyl esters using supercritical fluid carbon dioxide to produce cholesterol-rich and cholesterol-depleted fractions.

Food Science and Technology Abstracts, 20(8), Abstract 8 E 4 (1988) (Abstract of Bio/Technology 6(4), 393–394, 396 (1988)) describes industrial scale use of supercritical fluid extraction with retrograde condensation to recover the solute. Applications of this technology include extraction of caffeine from coffee, removal of toxic thujone from wormwood flavoring, extraction of triacylglycerols from many sources, extraction of sterols and steroids from poultry and meat products, and extraction of essential oils from thyme.

Food Science and Technology Abstracts, 20(8), Abstract 8 N 26 (1988) (Abstract of Energy in Agriculture 6(3), 265–271 (1987)) describes extraction of peanut oil using supercritical carbon dioxide.

Food Science and Technology Abstracts, 20(12), Abstract 12 N 16 (1988) (Abstract of Dissertation Abstracts International, B 48(9), 2632 (1988)) describes extraction of oil from Canola (*Brassica napus* or *B. campestris*) seed using supercritical carbon dioxide.

In addition to the problems previously mentioned, prior art processes for extraction of cholesterol and other components from foodstuffs using supercritical carbon dioxide normally involve high energy costs, since not only is the carbon dioxide itself costly, but before the carbon dioxide can be recycled to treat further batches of the foodstuff, the dissolved cholesterol is removed by allowing the carbon dioxide to evaporate (technically speaking, supercritical carbon dioxide is simply decompressed) to produce gaseous carbon dioxide and a liquid or solid residue, and the gaseous carbon dioxide must then be recompressed (and if necessary liquified) to produce supercritical carbon dioxide; this recompression is energy intensive. Accordingly, the cost of extraction of cholesterol from foodstuffs using supercritical carbon dioxide could be reduced if a way could be found to remove cholesterol from the carbon dioxide without the need to evaporate and recompress this material. This invention provides such a process for removal of cholesterol or other sterol compounds from carbon dioxide or other solvent laden with these sterols.

Furthermore, a wide variety of techniques have previously been employed in the extraction of materials from, and the purification of, complex organic mixtures, and examples of such techniques will now be given.

Abstract of International Patent Application Publication No. WO 88/02989 (1988) describes a process for the simultaneous deodorization and cholesterol reduction of fats and oils by deaeration, mixing with steam, heating, flash vaporizing, thin-film stripping with countercurrent steam, and cooling (all the preceding steps being performed under vacuum), and storage under oxygen-free conditions. This process demonstrates the difficulty in removing cholesterol from a foodstuff while maintaining the expected flavor thereof.

Deutsch et al., "Isolation of Lipids from plasma by Affinity Chromatography", Biochemical and Biophysical Research Communications, 50(3), 758–764 (1973) describes the extraction of certain lipid fractions from plasaa by affinity chromatography. Cross-linked agarose (SEPHAROSE 4B) was activated by the well known cyanogen bromide method of Cuatrecasas. Dodecylamine was then covalently bound to the activated agarose to provide the adsorbent. Plasma was mixed with the adsorbent, whereupon the adsorbent was then filtered and washed. Lipids were then eluted off the adsorbent with ethanol. This procedure removed approximately 50% of the triglycerides and nearly all of the cholesterol and lipoproteins.

U.S. Pat. No. 4,431,544 to Atkinson et al. teaches a high pressure liquid affinity chromatography by which biomolecules are extracted from solution and purified. Ligands are attached to matrices by way of spacer arms to provide the adsorbent. The matrix may be cross-linked agarose, and the spacer arms may be polyarginine or polylysine. The extraction of cholesterol from dairy products through this general-ligand affinity chromatography process is not feasible because of the broad specificity, and the toxic nature of the crosslinking agents. For example, cyanogen bromide is recommended for crosslinking a diaminoalkane spacer arm to cross-linked agarose. Cyanogen bromide is a well known cross-linking agent; however, cyanate groups are formed on the agarose hydroxyl groups not bound to spacer arms or ligands.

There is evidence that all systems using cyanogen bromide for coupling result in a significant degree of solubilization or leakage of the immobilized ligand. Parikh and Cuatrecasas discuss the problems associated with cyanogen bromide in their paper "Affinity Chromatography," Parikh et al., Chemical & Engineering News, Aug. 26, 1985, pages 17–32. Single point attachment of the ligand can result in a leakage of 1 ppm. Leakage can be reduced but evidently not eliminated. While the level of cyanide salts is less than the lethal dose of 0.1 milligrams percent, the possibility of cyanide contamination in food products should be avoided.

Heterogeneous mixtures of biomolecules may also be separated by differential migration chromatography, in which separation is effected by the differential migration of molecules through a filter material. The solute molecules migrate through the filter material at different rates due to different attractions occurring between the filter material and charges and/or functional groups on the solute molecules; the solute molecules are not actually retained on the filter material.

U.S. Pat. No. 4,544,485 to Pinkerton et al. teaches a high-pressure liquid chromatography process in which the packing material discriminates between analyte species on the basis of their different interactions with hydrophobic internal surfaces versus hydrophilic external surfaces. The hydrophobic surface may have lysine or arginine covalently bound to glyceroylpropyl groups on the support packing surface via hydroxy functionalities. The material is useful for separating small hydrophobic molecules (e.g., drugs) from protein-containing biological matrices.

U.S. Pat. No. 4,076,930 to Ellingboe teaches a column packing material which may be used to separate cholesterol, among other molecules. The material comprises hydroxyalkyl ethers of hydroxyalkoxy polysaccharides. Hydrocarbon radicals attached by ether linkages confer strongly lipophilic solvation characteristics.

U.S. Pat. No. 3,814,255 to Smernoff teaches a triglyceride cholesterol analysis in which the column material comprises activated porous inorganic oxide particles.

U.S. Pat. No. 3,817,706 to Smith teaches a fluorescence quantitative thin layer chromatographic method in which an adsorbent such as alumina, silicic acid or silica gel is used on a plate to separate analytes including cholesterol. These analytes are stained and quantified.

U.S. Pat. No. 3,997,298 to McLafferty et al. teaches a ligand chromatography-mass spectrometry system and method. Quantitative and qualitative analysis of analytes, including cholesterol, is effected using a system coupling a liquid chromatography column to a mass-spectrometer chemical ionization detector.

Netherlands Patent Application No 8304501A to Utrecht teaches a column structure for a high-pressure liquid chromatography procedure. Steroids and lipids may be separated.

U.S. Pat. No. 3,527,712 to Raun et al. teaches a dried agarose gel, a method of preparation thereof and production of an aqueous agarose gel. A dissolved macromolecular hydrocolloid is introduced into the porous structure of an agarose gel. The hydrocolloid may include cellulose derivatives, amides or polysaccharides. The material is useful for sorting molecules having molecular weights greater than 200,000, when present at concentrations of less than 5 percent. Separation of smaller molecules than molecular weight 200,000 is possible when the material is present at concentrations greater than 5 percent.

"Sephadex Column Chromatography as an Adjunct to Competitive Protein Binding Assays of Steroids," Nature New Biology, 232, 21–24 (July 1971), teaches using a column packing material comprising SEPHADEX LH-20 to separate heterogeneous mixtures of steroids. The alkylation of the hydroxyl groups of SEPHADEX makes it possible to elute with organic as well as aqueous solvents.

"Evaluation of a High-Performance Liquid Chromatography Method for Isolation and Quantitation of Cholesterol and Cholesterol Esters," Carroll et al., J. Lipid Res, 22(2), 359–363 (Feb. 1981), discusses using high pressure liquid chromatography for analyzing cholesterol.

Differential migration chromatographic techniques, including those outlined above, provide high resolution separation of solute materials. With this procedure it is possible to separate closely related compounds and thus enable qualitative and quantitative analysis of these compounds; however, such techniques are not commercially feasible for the extraction of cholesterol from foodstuffs because too many different solutes would be separated, the foodstuff would be highly diluted, and post-treatment of the foodstuff filtrate would be cumbersome.

Various potential methods for the separation of cholesterol from foodstuffs, including the affinity chromatography methods discussed above, depend upon the selection of a material which has a strong affinity for cholesterol. A number of substances are known to have such an affinity. These include macromolecular carrier proteins, specific amino acids, specific polypeptides, and polyene antibiotics.

The most logical substances for binding cholesterol would be those substances involved in cholesterol transport within biological systems. A number of papers discuss the isolation and characterization of these cholesterol carrier proteins. Examples of such papers include:

In "The Role of a Carrier Protein in Cholesterol and Steroid Hormone Synthesis by Adrenal Enzymes 1, 2, "Kan et al., Biochemical and Biophysical Research Communications, 48(2), 423–429 (1972). The adrenal glands are shown to contain a sterol carrier protein (SCP) similar to that of liver-SCP. The paper points out that SCP is required for cholesterol synthesis from squalene and steroid synthesis from cholesterol. SCP is thought to be present in yeast and protozoa.

Takase et al., "Characterization of Sterol Carrier Protein Binding with 7-Dehydrocholesterol and Vitamin D", J. Nutr. Sci. Vitaminol., 23, 53–61, (1977) discusses the role of Vitamin D3 in the relationship between rat liver sterol carrier protein (SCP) and cholesterol.

LeFevre et al., "Adrenal Cholesterol-Binding Protein: Properties and Partial Purification", Febs. Letters, 89(2), 287–292 (1978) discusses a heat-stable protein (CPB) present in the cytosol of adrenal glands, testes and ovaries which specifically binds tritiated cholesterol. A case is made differentiating the CPB from the known sterol-carrier protein present in liver.

Higuchi et al., "Comparative Studies on a Heat-Stable Cholesterol-Binding Protein in Dental Cyst Fluid and Serum", Int. J. Biochem., 13, 777–782 (1981) presents data indicating that dental cyst fluid contains a heat-stable cholesterol-binding protein (CPB) factor. A heated supernatant fraction of cyst fluid is reacted with a $C^{14}$ labeled cholesterol. A SEPHADEX column is used to separate the bound cholesterol from the free cholesterol. The concentration of bound cholesterol is determined by plotting the radioactivity.

Chen et al., "Prostate Protein: Isolation and Characterization of the Polypeptide Components and Cholesterol Binding", J. Biol. Chem., 257(1), 116–121 (1982) presents data concerning α-protein, a major protein in rat prostate secretions which originates in the rat ventral prostate. α-Protein is shown to bind cholesterol.

Sziegoleit, "Purification and Characterization of a Cholesterol-Binding Protein from Human Pancreas," Biochem. J., 207, 573–582 (1982) describes a cholesterol binding protein discovered in excreted lavage fluids. Immunologic analysis of the gut specific protein shows the organ of origination to be the pancreas. The protein not only binds cholesterol, but also the bile salt deoxycholate. The protein comprises a single polypeptide chain having a molecular weight of 28,000. The isoelectric point is at pH 4.9.

Regenass-Klotz et al., "Specific Binding of cholesterol to Chromatin Prepared from Mouse Spleen Cells", Can. J. Biochem. Cell Biol., 62, 94–99 (1984) presents data showing that cholesterol specifically binds to the chromatin of mouse splenic lymphocytes. The evidence points to the cholesterol actually binding to a high molecular weight protein in the chromatin preparation and not to deoxyribonucleic acid.

The carrier proteins discussed above show great affinity for cholesterol and would theoretically provide specific ligands for affinity chromatography; the binding site of any of these proteins could be immobilized and used for liquid chromatography to specifically remove cholesterol. However, the binding site is only a small part of the protein molecule, and thus a large mass of protein would be required to remove a small amount of cholesterol. In addition, if the natural protein is employed, the possibility of contaminants causing hepatitis and other viral diseases is always present. Consequently, in practice these methods are entirely unacceptable for use in food processing.

Klimov et al., "Interaction of Cholesterol with Polypeptides and Amino Acids", documents certain binding sites on amino acids and polypeptides which bind cholesterol. This article teaches that amino acids and compounds containing guanidinio groups (e.g., guanidine, metformine, arginine and polyarginine) and gamma-amino groups (e.g., lysine and polylysine) bind to cholesterol; however, there is no suggestion for using these substances for the extraction of cholesterol.

Certain antibiotics have been noted for their ability to bind to cholesterol. Notable amongst these are the polyenes filipin and pimaricin. Bornig et al., "Staining of Cholesterol with the Fluorescent Antibiotic Filipin", Acta Histochem., 50, 110–115 (1974) documents the affinity of filipin for non-esterified cholesterol, and cited its utility as a histochemical stain. Patterson, "Effects of Experimental Conditions on the Interaction of Filipin and Pimaricin with Cholesterol", Antibiot. (Tokyo), 32(11), 1193–2000 (1979) documents pimaricin as having similar properties to filipin. Others have noted the affinity that these polyenes have for cholesterol; see, for example, Geyer et al., "Filipin—A Histochemical Fluorochrome for Cholesterol", Acta Histochem [Suppl] (Jena), 15, 207–212 (1975);

Bittman et al., "Determination of Cholesterol Asymmetry by Rapid Kinetics of Filipin-Cholesterol Association: Effect of Modification in Lipids and Proteins", Biochemistry, 20(9), 2425–2432 (1981); and Behnke et al., "Filipin as a Cholesterol Probe. II. Filipin Cholesterol Interaction in Red Blood Cell Membranes", Eur. J. Cell Biol., 35(2), 200–215 (1984). None of the references suggest the use of pimaricin or filipin as a ligand to remove cholesterol from foodstuffs.

Evershed et al., "Strategy for the analysis of steryl esters from plant and animal tissues", J. Chrom. 400, 187 (1987), discusses various techniques for separation of steryl esters from complex biological mixtures, including various chromatographic separations.

Yamamura et al., Guest Selective Molecular Recognition by an Octadecylsilyl Monolayer Covalently Bound on an $SnO_2$ Electrode, J. Chem. Soc., Chem. Commun., 1988, 79–81 discloses the technique of adsorbing a templating molecule, such as a cholesterol derivative, on to a tin oxide surface, modifying the surface using a silane derivative, and desorbing the templating molecule in order to provide a modified surface having cavities which will accommodate cholesterol or other molecules which it is desired to adsorb.

Austrian Patent No. 341,636 describes a process for the reduction of cholesterol and of saturated, long-chain fatty acids in an animal fat, characterized in that there is used for extraction at least one monohydric primary and/or secondary alcohol with 2 to 4 carbon atoms, by which the content in the animal fat of cholesterol and fat with saturated, long-chain fatty acids etc. in each desired material is reduced to less than the corresponding value of plant fat and simultaneously the content of mono- or polyunsaturated fatty acids is raised.

British Patent No. 1,559,064 describes a process for reducing the cholesterol content of a food product of the butter type, in which process an anhydrous lactic fat is subjected to molecular distillation. The lactic fat is first heated to 70°–90° C. under a vacuum of 0.5 to 1 Torr to remove nitrogen and residual water, and then heated to 160°–230° C. on the evaporation surface under a very high vacuum (0.0005 to 0.005 Torr) so that the saponifiable components are distilled off, and separated from the unsaponifiable components containing the cholesterol.

French Patent Application Publication No. 2,601,959 describes a process for the elimination of cholesterol from a fatty material, especially butterfat. The liquid or melted fat is contacted with a cyclodextrin for a period of 30 minutes to 10 hours at a temperature between the melting point of the fatty material and 80° C. to permit the formation of complexes between the cholesterol and the cyclodextrin, and these complexes are separated by washing the fatty material with water and separating the aqueous phase. The method is claimed to remove up to 80% of the cholesterol in the original fat.

Japanese Patent Application Publication No. 63-39991 describes a method of purifying animal fats and oils containing 0.2 percent or more free cholesterol by dissolving the fat or oil in a non-polar solvent, passing the resulting solution through an adsorption column packed with an adsorbent which removes the cholesterol by a column chromatographic process, and removing the non-polar solvent by distillation. The adsorbents mentioned are silica gel, magnesium silicate, active clay, zeolites and "STET".

Schwartz et al., J. Lipid Res., 8, 54 (1967) describes a process for (allegedly) quantitative removal of cholesterol from butter fat by passage of the fat in hexane or benzene solution over a column of Celite impregnated with an aqueous solution of digitonin.

European Patent Application Publication No. 174,848 (New Zealand Dairy Research Institute) describes a process for removal of cholesterol from fats or oils, especially anhydrous milk fat, by passing the liquid fat or oil over an absorbent or adsorbent material preferably granulated activated carbon. A commercial grade of granulated activated carbon may be used without any special activation.

It has now been discovered that sterol compounds can be removed from fluid mixtures by contacting the mixture with charcoal which has been activated in a particular manner. In particular, sterol compounds can be removed from liquid comestible mixtures, including foodstuffs, in a highly selective manner and without substantial changes in the physical and nutritional properties of the foodstuff or other liquid comestible mixture by contacting the mixture with the activated charcoal. Also, the same charcoal can be used to remove sterol compounds from solvents, such as supercritical carbon dioxide, which have been used for extraction of foodstuffs, this removal of sterol compounds being effected without the need to evaporate and recompress the solvent.

Many foodstuffs which contain cholesterol also contain substantial amounts of saturated fats. It is now accepted that most people consume too much saturated fat, and accordingly there is a need for processes to remove saturated fat from foodstuffs. The charcoal used in the present invention not only removes sterol compounds, but also removes significant amounts of saturated fat from fluid mixtures containing such fat. The charcoal is especially effective in removing stearic (18:0) and arachidic (20:0) acids. Finally, when the saturated fatty acids are accompanied by desirable unsaturated fatty acids, the charcoal permits the sterols compounds and a significant amount of the saturated fatty acids to be removed without any significant removal of the unsaturated fatty acids.

SUMMARY OF THE INVENTION

This invention provides a process for the removal of at least one sterol compound and at least one saturated fatty acid from a fluid mixture, which process comprises contacting the fluid mixture with an activated charcoal, the activated charcoal having been produced by heating charcoal to a temperature of at least about 110° C. for a period of at least about 12 hours.

This invention also provides a process for the removal from a fluid mixture containing at least one sterol compound, at least one saturated fatty acid and at least one unsaturated fatty acid, of a major proportion of the sterol compounds and part of the saturated fatty acid without removal of a major proportion of the unsaturated fatty acid, which process comprises contacting the fluid mixture with an activated charcoal, the activated charcoal having been produced by heating charcoal to a temperature of at least about 110° C. for a period of at least about 12 hours.

As is conventional in the art, references herein to removal or non-removal of fatty acids from fluid mixtures refer not only to such removal or non-removal of the free fatty acids (very little of which are present in most foodstuffs), but also to such removal or non-removal of the esterified forms of such fatty acids, especially the glycerol triesters of fatty acids which constitute the bulk of natural fats and oils.

There are two main variants of the process of the invention. In the first variant, the activated charcoal is contacted directly with the fluid mixture from which a sterol compound and a fatty acid are to be removed; this variant will hereinafter be referred to as the "direct" process of the invention. In the second variant, a solvent is used to remove a sterol compound and a fatty acid from a material and the activated charcoal is thereafter contacted with the sterol and fatty acid-laden solvent; this variant will hereinafter be referred to as the "indirect" process of the invention.

BRIEF DESCRIPTION OF THE DRAWING

The sole FIGURE of the accompanying drawing is a highly schematic representation of an apparatus for carrying out the indirect process of the invention.

DETAILED DESCRIPTION OF THE INVENTION

As already mentioned, the present invention provides a process for the removal of a sterol compound, especially cholesterol, and a saturated fatty acid, from a fluid mixture. In this process, the fluid mixture is contacted with an activated charcoal which has been produced by heating charcoal to a temperature of at least about 110° C. for a period of at least about 12 hours.

Desirably, the charcoal used in the present process is produced by heating charcoal to a temperature of at least about 125° C., and preferably in the range of from about 125° to 150° C., for a period of at least about 24 hours. It is also desirable that the activated charcoal be produced by heating the charcoal in an oxygen-containing gas, and preferably, during the heating of the charcoal, the oxygen-containing gas is blown over the charcoal during the heating. After this heating, care should be taken to ensure that water is not resorbed on to the charcoal before the charcoal is used in the present process; storage of the activated charcoal in a dessicator over a drying agent such as sodium sulfate or calcium chloride is recommended to prevent such resorption of water.

The activation of charcoal required for its use in the process of the present invention has a very marked effect upon the adsorption properties of the charcoal. As illustrated in the Examples below, when oil is loaded on to a column of the activated charcoal, the major oil fraction is not eluted by non-polar solvents such as hexane, but only by more polar solvents such as methylene chloride. On the other hand, when the same oil is loaded on to a column of non-activated charcoal, the major oil fraction is eluted with the non-polar solvent hexane.

The extent of removal of saturated fatty acids in the process of the present invention varies with the number of carbon atoms in the saturated fatty acids. In general, the present process does not remove large proportions of fatty acids containing 14 or less carbon atoms, and the proportion of saturated fatty acid removed increases with increasing numbers of carbon atoms in the fatty acid. As illustrated in the Examples below, the present invention will typically remove about 13% of the palmitic (16:0), about 34% of the stearic (18:0), about 51% of the arachidic (20:0) and about 82% of the behenic (22:0) acid present in the starting material.

Since the adsorption of sterol compounds and saturated fatty acids is a surface phenomenon, a finely divided activated charcoal should be employed in the present process so as to provide a high surface area available for adsorption per unit weight of the charcoal. It has been found that charcoal of 50–200 U.S. mesh gives good results in the present process. If the activated charcoal is to be employed in the direct process of the invention, in which the activated charcoal comes into intimate contact with the fluid mixture, it is of course essential that the activated charcoal be free from any material, for example heavy metals, which could leach into and be unacceptable in the treated mixture.

The present process may be employed to remove sterol compounds and saturated fatty acids from comestible liquid and other fluid mixtures. The "comestible liquid mixtures" used in the process of the present invention include not only foodstuffs, for example egg yolk oil, which are inherently liquid, but also solid or semi-solid foodstuffs, for example solid animal fats such as lard, which can be made in a liquid form by dissolving them in an appropriate solvent which does not interfere with the sterol-removal process. The present process can also be used to remove sterol compounds and saturated fatty acids from solvents, such as supercritical carbon dioxide, laden with these materials.

When the present process is used to treat fats and oils of animal origin, it has the additional advantage that, when the fat or oil being treated contains unsaturated fatty acids (many of which are desirable dietary components), a major proportion of the sterol compounds and a significant proportion of the saturated fatty acids can be removed without removal of a major proportion of the unsaturated fatty acids. More specifically, as demonstrated in the Examples below, the process can be carried out so that more than 90 percent of the sterol compounds and more than 30 percent of the stearic acid are removed, while at least about 80 percent of the unsaturated fatty acids remain in the fluid mixture.

More specifically, the process of the present invention can advantageously be applied to the treatment of fish oils containing at least one omega-3 polyunsaturated fatty acid; with such oils, it is possible to achieve at least about 90 percent removal of the sterol compounds and at least 30 percent removal of the stearic acid present in the original fish oil, but leave at least about 90 percent of the omega-3 fatty acids in the fish oil. One further advantage of the treatment of fish oil by the present process is that the process removes most of the objection odors and flavors which result from oxidative decomposition, or which are inherent in the original fish oil. Thus, the purified fish oil prepared by the present process has much reduced taste and odor, and is thus easier to incorporate into foodstuffs in which its polyunsaturated fatty acids may be desirable but in which its obnoxious taste and odor have hitherto barred its use.

The process of the present invention should in general not be used for removal of cholesterol from materials, such as egg yolks, which contain a combination of cholesterol and proteins, since if the present process is applied to such materials significant adsorption of proteins and their constituent amino acids occurs on the charcoal. In some cases, adsorption of phospholipids and other materials may also occur. If it is desired to use the present invention for removal of cholesterol from egg yolks, it is recommended that the egg yolks first be converted to egg yolk oil by conventional procedures which are well-known to those skilled in food technology, the egg yolk oil decholesterized by the process of the present invention, and, if necessary, the egg yolks reconstituted from the decholesterized egg yolk oil and the other fractions.

In some cases, treatment of food materials by the process of the present invention may result in adsorption of coloring and/or flavoring materials by the charcoal, thus resulting in noticeable changes in the appearance of the food material. For example, when butter oil is treated by the present process, the treated oil is much paler in color than the untreated oil because the charcoal adsorbs a substantial proportion of the $\beta$-carotene in the oil. In many cases, as for example when the butter oil is intended for use in baked goods, the loss of color is of little or no consequence. However, if the loss of color is of importance, as for example when the butter is intended to be consumed as such, the color can easily be restored either by adding $\beta$-carotene or by adding an artificial butter coloring material.

The process of the present invention is also especially useful for the treatment of dairy fats, which contain many desirable nutrients, for example calcium, but which also contain undesirably large amounts of cholesterol and saturated fatty acids, especially stearic acid. A specific dairy fat which can be treated by the present process is butter oil; the treated butter oil may then be used in the preparation of butter substitutes.

In some cases, the process of the present invention could be practiced simply by mixing the activated charcoal, in pulverulent form, with a liquid oil, and then separating the charcoal from the oil by filtration or centrifugation. However, such a process will not produce optimum removal of sterol compounds and saturated fatty acids, and is obviously impracticable in the case of many sterol-containing materials, such as solid animal fats. Accordingly, it is preferred to carry out the direct process of the present invention by dissolving the material to be treated in a non-polar solvent, and passing the resultant solution through a bed or column of the activated charcoal. Appropriate non-polar solvents for this purpose are alkanes, hexane being the preferred alkane.

In many cases, when the present process is carried out by passing a solution of a fat or oil in a non-polar solvent through a bed or column of the activated charcoal, the fat or oil becomes adsorbed on to the charcoal. The fat or oil can be desorbed from the charcoal without desorption of all the sterol compounds and saturated fatty acids by contacting the charcoal with a semi-polar solvent. Preferred semi-polar solvents for this purpose are halogenated alkanes, especially methylene chloride.

As is well known to those skilled in adsorption technology, for thermodynamic reasons the maximum amount of adsorbate per unit surface area of adsorbent normally decreases with increasing temperature. Accordingly, during the present process, the temperature is desirably kept low; in practice, operating at room temperature (about 20° C.) has been found to give satisfactory results.

The following Examples are now given, though by way of illustration only, to show details of preferred reagents, conditions and techniques used in the process of the present invention. Unless otherwise stated, all parts are by weight.

EXAMPLE 1

Preparation of Activated Adsorbents and Packing of Multiple-Bed Column Therewith This Example illustrates the preparation of activated charcoal and other adsorbents for use in the process of the present invention, and the preparation of multiple-bed columns containing the activated charcoal and other adsorbents.

A commercially-available 50–200 U.S. mesh charcoal and a commercially-available 230–425 U.S. mesh silica gel were both activated by heating in a forced draft oven at 130° C. for 48 hours. After this heating, the charcoal and silica gel were allowed to cool in a desiccator.

A column was prepared by placing the activated charcoal in a 1 l. beaker and adding a sufficient volume of n-hexane. The resultant mixture was stirred thoroughly with strong glass rod until a uniform slurry of the charcoal was formed. A slurry of the activated silica gel in n-hexane was formed in a similar manner.

A 1 m. by 49 mm. internal diameter glass chromatographic column fitted with a sealed-in coarse porosity fritted disk and a polytetrafluoroethylene stopcock was employed. A piece of glass wool was soaked in a beaker containing n-hexane and manipulated by pressing it in various directions with a glass rod until the glass wool was completely free from air bubbles.

The stopcock of the column was closed, n-hexane poured into the column to a depth of 100 mm., and the stopcock was then reopened to allow the hexane to drain through the fritted disc, thereby ensuring that no air bubbles remained in the disc. After the stopcock had again been closed, the deaerated glass wool was introduced into the column by pushing it down the column with a long glass rod, and the stopcock was again opened to allow hexane to drain slowly from the column. As the hexane slowly drained, the glass wool pad was pressed with a glass rod to ensure that all air bubbles had been excluded therefrom. When the hexane depth had been reduced to about 70 mm., the stopcock was again closed and additional hexane added to the column until its depth had been restored to about 100 mm.

Next, sufficient silica gel slurry was added to the column to provide 25 g. of silica gel. The silica gel slurry was poured into the column through a glass filter funnel with the aid of a hexane wash bottle. The stopcock was opened and the hexane flow adjusted so that 50–60 mm. of hexane remained on to top of the silica gel layer, while the column was tapped gently with a rubber hose to ensure even and proper packing of the silica gel.

A second layer containing 500 g. of activated charcoal and a third layer containing 75 g. of silica gel were formed in the column by the same slurry addition technique. 10 g. of anhydrous sodium sulfate was then poured into the column in a gentle stream through a glass filter funnel to form an even layer on top of the silica gel, and the column was tapped gently with a rubber hose to ensure even and proper packing of the sodium sulfate. Finally, a pad of deaerated glass wool was placed on top of the column using the same technique as for the earlier glass wool pad. The column was now ready for use.

The silica gel was included in the column to facilitate visual observation of the elution of certain bands in various Examples below. Since some of the bands were colored, their elution through a white silica gel layer could be followed visually, whereas their elution through a black charcoal layer could not. The silica gel did not significantly contribute to the cholesterol removal process, and once the points at which the various bands eluted has been determined, the silica gel could be omitted from the column, as was done in some of the later Examples below.

EXAMPLE 2

Purification of Refined Fish Oil With Activated Multiple-Bed Column

This Example illustrates the purification of refined fish oil using the activated multiple-bed column prepared in Example 1 above.

50 G. of commercially available refined fish oil were placed on top of the activated multiple-bed column prepared in Example 1 above. The column was then eluted with the following solvents in the order specified:

(a) n-Hexane (6 l.)
(b) Diethyl ether (2 l.)
(c) Methylene chloride (4 l.)
(d) Anhydrous methanol (2 l.).

The eluates in the various solvents were collected as they left the column and distilled at low temperatures to remove the solvents and leave behind the fish oil fractions. Residual traces of solvent in the oil fractions were evaporated on a steam bath under a gentle stream of nitrogen, and thereafter the oil fractions were weighted. The results are shown in Table 1 below.

TABLE 1

| Solvent | Wt. of oil recovered | % of oil recovered |
|---|---|---|
| Hexane | 0.04 | 0.08 |
| Diethyl ether | 0.02 | 0.04 |
| Methylene chloride | 24.55 | 49.10 |
| Anhydrous methanol | 2.33 | 4.66 |

Because the proportions of oil recovered from the hexane and diethyl ether eluates were so small, these oil fractions were not submitted to analysis. However, the methylene chloride and methanol derived oil fractions were analyzed for their cholesterol content and fatty acid profiles by packed-column gas chromatography-flame ionization detection and capillary column gas chromatography-flame ionization detection respectively. The untreated fish oil was also subjected to the same analyses. The results of the cholesterol analyses are shown in Table 2 below, while the results of the fatty acid analyses are shown in Table 3 below. In both Tables 2 and 3, and in similar Tables in other Examples below, the relative amounts of cholesterol and fatty acid are calculated from the areas under the relevant peaks of the chromatogram.

TABLE 2

| Eluate | Cholesterol (mg/100 g.) | % Cholesterol Removal |
| --- | --- | --- |
| Untreated oil | 325.6 | 0 |
| Methylene chloride | 4.4 | 98.65 |
| Methanol | 2.2 | 99.20 |

TABLE 3

| Acid | Untreated Oil | Methylene Chloride Eluate | Methanol Eluate |
| --- | --- | --- | --- |
| 10:0 | — | — | — |
| 12:0 | 0.08 | 0.10 | 0.07 |
| 14:0 | 7.99 | 9.36 | 8.83 |
| 14:1 | 0.56 | 0.59 | — |
| 16:0 | 21.45 | 19.40 | 24.83 |
| 16:1 $T_9$ | 0.29 | 0.35 | 0.57 |
| 16:1 $C_9$ | 10.58 | 12.90 | 12.03 |
| 17:0 | 0.47 | 0.37 | 0.51 |
| 18:0 | 3.88 | 2.42 | 3.62 |
| 18:1 $T_9$ | 1.67 | 1.97 | 1.65 |
| 18:1 $C_5$ | 8.57 | 9.51 | 9.83 |
| 18:1 $C_9$ | 3.11 | 3.38 | 2.89 |
| 18:1 $C_{11}$ | 0.11 | 0.12 | 0.13 |
| 18:2 $T_{9,12}$ | 0.21 | 0.23 | 0.21 |
| 18:2 $C_9$, $T_{12}$ | 0.17 | 0.19 | 0.22 |
| 18:2 $C_{9,12}$ | 1.94 | 1.40 | 1.91 |
| 18:3 $C_{6,9,12}$ | 0.30 | 0.33 | 0.32 |
| 18:3 $C_{9,12,15}$ (W-3) | 2.51 | 2.73 | 2.36 |
| 18:4 $_{9,11,13,15}$ (W-3) | 0.16 | — | 0.08 |
| 20:0 | 0.36 | 0.15 | 0.23 |
| 20:1 $C_5$ | 0.58 | 0.62 | 0.54 |
| 20:1 $C_{11}$ | 0.37 | 1.22 | 1.48 |
| 20:2 | 0.21 | 0.19 | 0.18 |
| 20:3 | 0.81 | 0.85 | 0.68 |
| 20:5 (W-3) | 11.37 | 11.781 | 9.27 |
| 22:0 | 1.18 | 1.13 | 0.92 |
| 22:5 (W-3) | 1.84 | 1.58 | 1.38 |
| 22:6 (W-3) | 5.77 | 4.66 | 4.41 |

From the data in Tables 2 and 3, it will be seen that the process of the present invention was highly effective in removing cholesterol from the fish oil; the oil fractions recovered from the methylene chloride and methanol eluates contained, on a weight/weight basis, only 1.35 percent and 0.8 percent of the cholesterol in the initial fish oil. Furthermore, the process of the present invention achieved these high levels of cholesterol removal while retaining a high proportion of the original unsaturated fatty acids in the fish oil. The extent of retention of the desirable omega-3 polyunsaturated fatty acids is best seen from Table 4 below, which displays selected data from Table 3 above to show the high retention of omega-3 fatty acids in the recovered oil.

TABLE 4

| W-3 Acid | Before Chrom. | After Chromatography | | | |
| --- | --- | --- | --- | --- | --- |
| | | $CH_2Cl_2$ eluate | % of Initial | MeOH eluate | % of Initial |
| 18:3 | 2.51 | 2.73 | 108.76 | 2.36 | 94.02 |
| 18:4 | 0.16 | — | — | 0.08 | 50.00 |
| 20:5 | 11.37 | 11.78 | 103.60 | 9.27 | 81.53 |
| 22:5 | 1.84 | 1.58 | 85.87 | 1.38 | 75.00 |
| 22:6 | 5.77 | 4.66 | 80.76 | 4.41 | 76.43 |
| Totals | 21.65 | 20.75 | | 17.50 | |
| % Of Initial (W-3) | | | 95.84 | | 80.83 |
| % Of Initial (Oil) | | | 49.10 | | 4.66 |

From Tables 3 and 4, it will be seen that although only about 54 percent of the oil was recovered from the process, this recovered oil contained almost as much of the desirable omega-3 fatty acids per unit weight as the original oil. Thus, the process of the present invention was able to achieve about 99 percent removal of cholesterol without significant reduction in the omega-3 fatty acid content of the oil.

Table 3 above also illustrates the ability of the column to remove saturated fatty acids from the fish oil. The oil fraction recovered from the methylene chloride had its levels of palmitic, stearic and arachidic acids reduced by 10%, 37.6% and 58.33% percent respectively, as compared with the oil starting material.

EXAMPLE 3

Purification of Butter Oil With Activated Multiple-Bed Column

This Example illustrates the purification of butter oil using a multiple-bed column similar to that prepared in Example 1 above.

Butter oil was prepared from butter purchased at a retail store. One pound of the butter was cut into small pieces with a spatula and these pieces were placed in a beaker and melted on a low temperature steam bath. The contents of the beaker were then transferred to a 1 l. separatory funnel, the beaker rinsed with a small quantity of hot distilled water and the washings added to the separatory funnel. The funnel was immersed in a low temperature water bath until the aqueous and oil phases had completely separated. The funnel was then removed from the bath, the lower aqueous phase drained off, an additional 50 ml. of hot water added to the funnel, the contents of the funnel swirled vigorously and the funnel returned to the low temperature water bath. After the aqueous and oil phases had again completely separated, the aqueous phase was separated in the same manner as before. The hot water washing treatment was repeated twice more to completely remove milk solids from the butter.

Following the third washing, the funnel was vigorously swirled and placed in the low temperature water bath for about five minutes; after this time, a small quantity of aqueous phase had separated from the oil phase. The oil phase was then poured hot in a slow stream from the top of the funnel into a bed of 50 g. of anhydrous sodium sulfate resting on a glass wool pad in a large filter funnel. The clear, dry butter oil passing through the filter funnel was collected in a 500 ml. Erlenmeyer flask provided with a ground glass stopper.

The resultant butter oil was then treated using a column generally similar to that used in Example 2 above but containing a lower layer of 25 g. of silica gel, a layer of 450 g. of the activated charcoal, a layer of 75 g. of silica gel, a layer of 10 g. of anhydrous sodium sulfate and, at the top, a pad of deaerated glass wool. 50 G. of the butter oil were placed on top of the column and the column was then eluted with the following solvents in the order specified:

(a) n-Hexane (3 l.)
(b) Methylene chloride (4 l.)
(c) Anhydrous methanol (2 l.).

The eluates in the various solvents were collected as they left the column and distilled at low temperatures to remove the solvents and leave behind the butter oil fractions. Residual traces of solvent in the oil fractions were evaporated on a steam bath under a gentle stream of nitrogen, and thereafter the oil fractions were weighed. The results are shown in Table 5 below.

TABLE 5

| Solvent | Wt. of oil recovered | % of oil recovered |
| --- | --- | --- |
| Hexane | 0.12 | 0.24 |

TABLE 5-continued

| Solvent | Wt. of oil recovered | % of oil recovered |
|---|---|---|
| Methylene chloride | 32.15 | 64.30 |
| Anhydrous methanol | 3.02 | 6.02 |

Because the proportion of oil recovered from the hexane eluate was so small, this oil fraction was not submitted to analysis. However, the methylene chloride and methanol derived oil fractions were analyzed for their cholesterol content and fatty acid profiles by packed-column gas chromatography-flame ionization detection and capillary column gas chromatography-flame ionization detection respectively. The untreated butter oil was also subjected to the same analyses. The results of the cholesterol analyses are shown in Table 6 below, while the results of the fatty acid analyses are shown in Table 7 below.

TABLE 6

| Eluate | Cholesterol (mg/100 g.) | % Cholesterol Removal |
|---|---|---|
| Untreated oil | 274.3 | 0 |
| Methylene chloride | 1.3 | 99.52 |
| Methanol | 15.3 | 94.42 |

TABLE 7

| Acid | Untreated Oil | Methylene Chloride Eluate | Methanol Eluate |
|---|---|---|---|
| 4:0 | 1.15 | 1.27 | 1.47 |
| 6:0 | 0.73 | 1.02 | 0.75 |
| 8:0 | 0.63 | 0.87 | 0.56 |
| 10:0 | 1.88 | 2.48 | 1.76 |
| 12:0 | 2.75 | 3.31 | 2.71 |
| 14:0 | 10.37 | 11.21 | 10.74 |
| 14:1 $C_9$ | 1.17 | 1.23 | 1.24 |
| 16:0 | 30.89 | 29.35 | 33.49 |
| 16:1 $T_9$ | 0.43 | 0.47 | 0.40 |
| 16:1 $C_9$ | 1.88 | 2.20 | 1.68 |
| 17:0 | 0.76 | 0.68 | 0.80 |
| 18:0 | 12.45 | 8.69 | 12.56 |
| 18:1 $C_5$ | 22.00 | 24.31 | 20.28 |
| 18:1 $C_9$ | 0.35 | 0.38 | 0.33 |
| 18:1 $C_{11}$ | 0.44 | 0.40 | 0.43 |
| 18:2 $T_{9,12}$ | 0.19 | 0.31 | 0.15 |
| 18:2 $C_{9,12}$ | 2.45 | 2.55 | 1.78 |
| 20:0 | 0.17 | 0.06 | 0.23 |
| 20:1 $C_{11}$ | 0.53 | 0.48 | 0.35 |
| 22:0 | 0.16 | 0.12 | 0.09 |

From the data in Tables 6 and 7, it will be seen that the process of the present invention was highly effective in removing cholesterol from the butter oil; the oil fractions recovered from the methylene chloride and methanol eluates contained, on a weight/weight basis, only 0.48 percent and 5.58 percent of the cholesterol in the initial butter oil. Furthermore, the process of the present invention achieved these high levels of cholesterol removal while retaining a high proportion of the original unsaturated fatty acids in the butter oil.

It will also be seen from Table 7 that the process was effective in removing substantial proportions of saturated fatty acids from the butter oil. The oil fraction recovered from the methylene chloride eluate had a stearic (18:0) acid content which was reduced by more than 30 percent, and an arachidic (20:0) acid content which was reduced by more than 50 percent, as compared with the starting butter oil.

EXAMPLE 4

Purification of Refined Fish Oil With Activated Single-Adsorbent Bed Charcoal Column This Example illustrates the purification of refined fish oil in a manner generally similar to that of Example 2 above, but using a higher ratio of charcoal to oil.

Six separate columns were prepared using the same technique as in Example 1 above, except that the silica gel layers were omitted, so that the sole active layer of each column comprised 150 g. of charcoal. To each column was added 10 g. of commercially available refined fish oil. The column was then eluted with the following solvents in the order specified:

(a) n-Hexane (250 ml.)
(b) Methylene chloride (1.5 l.)
(c) Anhydrous methanol (750 ml.).

The eluates were collected as they left the columns, the hexane and methylene chloride eluates from each column being pooled and the methanol eluate collected separately. Thus, the six columns yielded a total of 12 eluate fractions. Each of these fractions was distilled at low temperatures to remove the solvents and leave behind the fish oil fractions. Residual traces of solvent in the oil fractions were evaporated on a steam bath under a gentle stream of nitrogen, and thereafter the oil fractions were weighted. The results are shown in Table 8 below.

TABLE 8

| Column No. | Wt. of oil recovered Hexane/$CH_2Cl_2$ (g.) | Wt. of oil recovered Methanol (g.) |
|---|---|---|
| 1 | 4.44 | 0.11 |
| 2 | 5.78 | 0.13 |
| 3 | 5.24 | 0.13 |
| 4 | 5.74 | 0.11 |
| 5 | 5.07 | 0.11 |
| 6 | 5.59 | 0.12 |
| Mean | 5.145 | 0.118 |
| Average Yield | 51.45% | 1.18% |

Because the proportions of oil recovered from the methanol eluates were so small, the six methanol-derived oil samples were combined for purposes of analysis. The combined methanol-derived oil fraction and the six pooled hexane/methylene chloride oil fractions were analyzed for their cholesterol content and fatty acid profiles by packed column gas chromatography-flame ionization detection and capillary column gas chromatography-flame ionization detection respectively. The untreated fish oil was also subjected to the same analyses. The results of the cholesterol and analyses are shown in Tables 9A and 9B below, while the results of the fatty acid analyses are shown in Table 10 below.

TABLE 9A

| Oil Fraction | Cholesterol (mg/100 g.) | % Cholesterol Removal |
|---|---|---|
| Untreated oil | 366.10 | 0 |
| No. 1 column | Not Detected | 100.00 |
| No. 2 column | 2.74 | 99.25 |
| No. 3 column | Not Detected | 100.00 |
| No. 4 column | Not Detected | 100.00 |
| No. 5 column | Not Detected | 100.00 |
| No. 6 column | Not Detected | 100.00 |
| Mean | | 99.875 |
| Standard Deviation | | 0.306 |
| Variance | | 0.09375 |
| Average Recovery of | | 51.45% |

TABLE 9A-continued

| Oil Fraction | Cholesterol (mg/100 g.) | % Cholesterol Removal |
|---|---|---|
| Decholesterized Oil | | |

TABLE 9B

| Oil Fraction | Cholesterol (mg/100 g.) | % Cholesterol Removal |
|---|---|---|
| Untreated oil | 366.10 | 0 |
| Combined methanol eluates | 7.03 | 98.1 |

TABLE 10

| Acid | Untreated Oil | Methanol Fraction | Hexane/Methylene chloride oil fractions | | | | | |
|---|---|---|---|---|---|---|---|---|
| | | | 1 | 2 | 3 | 4 | 5 | 6 |
| 12:0 | 0.09 | 0.06 | 0.10 | 0.10 | 0.10 | 0.09 | 0.09 | 0.10 |
| 14:0 | 8.59 | 9.05 | 9.75 | 9.20 | 9.79 | 9.48 | 9.35 | 9.44 |
| 14:1 | 0.03 | 0.03 | 0.05 | 0.04 | 0.04 | — | 0.03 | 0.04 |
| 16:0 | 22.27 | 21.86 | 17.46 | 19.46 | 19.07 | 20.07 | 19.52 | 19.57 |
| 16:1 $T_9$ | 0.23 | 0.28 | 0.31 | 0.22 | 0.22 | 0.51 | 0.28 | 0.28 |
| 16:1 $C_9$ | 8.43 | 10.12 | 11.78 | 9.94 | 10.70 | 10.36 | 10.45 | 10.50 |
| 17:0 | 0.44 | 0.46 | 0.48 | 0.38 | 0.37 | 0.40 | 0.40 | 0.39 |
| 18:0 | 3.51 | 2.73 | 1.75 | 2.55 | 2.09 | 2.56 | 2.45 | 2.34 |
| 18:1 $T_9$ | 0.95 | 1.11 | 1.52 | 1.27 | 1.37 | 1.13 | 1.29 | 1.27 |
| 18:1 $C_5$ | 5.98 | 7.09 | 6.53 | 6.09 | 6.26 | 6.23 | 6.22 | 6.20 |
| 18:1 $C_9$ | 3.06 | 3.50 | 3.33 | 3.10 | 3.21 | 3.21 | 3.33 | 3.14 |
| 18:1 $C_{11}$ | 0.22 | 0.24 | 0.23 | 0.20 | 0.21 | 0.22 | 0.26 | 0.21 |
| 18:2 $T_{9,12}$ | 0.60 | 0.52 | 0.75 | 0.67 | 0.71 | 0.72 | 0.72 | 0.70 |
| 18:2 $C_9, T_{12}$ | 0.06 | 0.10 | 0.12 | 0.10 | 0.08 | 0.10 | 0.10 | 0.10 |
| 18:2 $C_{9,12}$ | 1.64 | 1.86 | 2.16 | 1.93 | 1.97 | 1.96 | 1.97 | 1.96 |
| 18:4 9,11,13,15 (W-3) | 4.31 | 4.49 | 5.11 | 4.81 | 4.97 | 4.89 | 5.01 | 4.89 |
| 20:0 | 0.34 | 0.19 | 0.11 | 0.20 | 0.16 | 0.19 | 0.17 | 0.16 |
| 22:1 $C_5$ | 0.32 | 0.39 | 0.40 | 0.38 | 0.39 | 0.36 | 0.37 | 0.38 |
| 20:1 $C_{11}$ | 1.30 | 1.32 | 1.93 | 1.36 | 1.42 | 2.00 | 1.97 | 1.98 |
| 20:3 | 0.75 | 0.71 | 0.82 | 0.74 | 0.85 | 0.75 | 0.84 | 0.75 |
| 20:5 (W-3) | 11.93 | 11.75 | 13.24 | 13.09 | 13.35 | 12.98 | 13.20 | 12.93 |
| 22:0 | 0.16 | 0.04 | 0.02 | 0.04 | 0.02 | 0.03 | 0.03 | 0.03 |
| 22:5 (W-3) | 2.12 | 1.91 | 1.76 | 2.01 | 1.92 | 2.00 | 1.98 | 1.92 |
| 22:6 (W-3) | 11.65 | 8.48 | 8.33 | 10.34 | 9.45 | 10.12 | 10.02 | 9.77 |

From the data in Tables 9A and 10, it will be seen that the process of the present invention was highly effective in removing cholesterol from the fish oil; the oil fractions recovered from the combined hexane/methylene chloride eluates contained, on a weight/weight basis, only 0.125 percent of the cholesterol in the initial fish oil. Furthermore, the process of the present invention achieved this high level of cholesterol removal while retaining a high proportion of the original unsaturated fatty acids in the fish oil. The extent of retention of the desirable omega-3 polyunsaturated fatty acids is best seen from Table 11 below, which displays selected data from Table 10 above to show the high retention of omega-3 fatty acids in the recovered oil.

TABLE 11

| W-3 Acid | Before Chrom. Unfractionated Oil | After Chromatography | |
|---|---|---|---|
| | | Fractionated Oil (average of 6 columns) | % of Initial |
| 18:4 | 4.31 | 4.95 | 114.77 |
| 20:5 | 11.93 | 13.13 | 110.07 |
| 22:5 | 2.12 | 1.93 | 91.12 |
| 22:6 | 11.65 | 9.67 | 83.02 |
| Total | 30.01 | 29.68 | |
| % of Initial | | 98.9 | |
| Oil Yield | | 51.45% | |

From Tables 10 and 11, it will be seen that although only about 51.45 percent of the oil was recovered in the pooled hexane/methylene chloride eluates from the process, this recovered oil contained almost as much of the desirable omega-3 fatty acids per unit weight as the original oil. Thus, the process of the present invention was able to achieve more than 99 percent removal of cholesterol without significant reduction in the omega-3 fatty acid content of the oil.

Table 10 above also illustrates the ability of the column to remove saturated fatty acids from the fish oil. The oil fraction recovered from the pooled hexane/methylene chloride eluates had its levels of 16:0, 18:0, 20:0 and 22:0 fatty acids reduced by 13.8%, 34.8%, 51.5% and 82.3% percent respectively, as compared with the oil starting material. Thus, the proportion of saturated fatty acids removed by the charcoal increases with the number of carbon atoms in the saturated fatty acid.

EXAMPLE 5

Purification of Butter Oil With Activated Single-Adsorbent Bed Charcoal Column

This Example illustrates the purification of butter oil in a manner similar to that of Example 4 above.

Six additional columns identical to those used in Example 4 above were prepared and used to treat butter oil prepared in the manner described in Example 3 using the same amounts of the same solvents as in Example 4. The oil fractions were prepared in the same manner as before. Tables 12, 13A, 13B and 14 below give the same data as Tables 8, 9A, 9B and 10 respectively in Example 4, namely the weights of oil recovered, the cholesterol analyses and the fatty acid analyses of the various fractions.

TABLE 12

| Column No. | Wt. of oil recovered Hexane/$CH_2Cl_2$ (g.) | Wt. of oil recovered Methanol (g.) |
|---|---|---|
| 1 | 6.01 | 0.16 |
| 2 | 5.63 | 0.17 |
| 3 | 5.57 | 0.19 |
| 4 | 6.00 | 0.17 |
| 5 | 5.82 | 0.15 |
| 6 | 5.98 | 0.15 |
| Mean | 5.793 | 0.165 |

TABLE 12-continued

| Column No. | Wt. of oil recovered Hexane/CH$_2$Cl$_2$ (g.) | Wt. of oil recovered Methanol (g.) |
|---|---|---|
| Average Yield | 57.93% | 1.65% |

TABLE 13A

| Oil Fraction | Cholesterol (mg/100 g.) | % Cholesterol Removal |
|---|---|---|
| Untreated oil | 269.50 | 0 |
| No. 1 column | Not Detected | 100.00 |
| No. 2 column | Not Detected | 100.00 |
| No. 3 column | 0.48 | 99.82 |
| No. 4 column | 0.30 | 99.89 |
| No. 5 column | 1.44 | 99.47 |
| No. 6 column | 0.10 | 99.96 |
| Mean | | 99.86 |
| Standard Deviation | | 0.202 |
| Variance | | 0.04075 |
| Average Recovery of Decholesterized Oil | | 57.93% |

TABLE 13B

| Oil Fraction | Cholesterol (mg/100 g.) | % Cholesterol Removal |
|---|---|---|
| Untreated oil | 269.50 | 0 |
| Combined methanol eluates | 3.17 | 98.82 |

TABLE 14

| Acid | Untreated Oil | Methanol Fraction | Hexane/Methylene chloride oil fractions | | | | | |
|---|---|---|---|---|---|---|---|---|
| | | | 1 | 2 | 3 | 4 | 5 | 6 |
| 4:0 | 2.03 | — | 2.64 | 2.02 | 2.11 | 1.80 | 2.06 | 2.02 |
| 6:0 | 1.24 | 0.17 | 1.78 | 1.75 | 1.74 | 1.58 | 1.75 | 1.74 |
| 8:0 | 0.87 | 0.05 | 1.22 | 1.21 | 1.20 | 1.14 | 1.24 | 1.18 |
| 10:0 | 2.40 | 0.51 | 3.07 | 3.07 | 3.04 | 2.85 | 3.16 | 3.04 |
| 12:0 | 3.14 | 2.36 | 3.69 | 3.76 | 3.71 | 3.51 | 3.79 | 3.68 |
| 14:0 | 11.07 | 11.38 | 11.68 | 11.69 | 11.64 | 11.39 | 11.84 | 11.45 |
| 14:1 C$_9$ | 1.23 | 1.29 | 1.24 | 1.23 | 1.24 | 1.21 | 1.25 | 1.17 |
| 16:0 | 30.80 | 34.09 | 29.06 | 28.81 | 28.89 | 29.22 | 28.64 | 28.80 |
| 16:1 T$_9$ | 0.31 | 0.51 | 0.38 | 0.38 | 0.46 | 0.38 | 0.37 | 0.38 |
| 16:1 C$_9$ | 1.53 | 2.04 | 2.02 | 1.94 | 2.02 | 1.89 | 1.99 | 1.96 |
| 17:0 | 0.69 | 0.85 | 0.68 | 0.67 | 0.68 | 0.63 | 0.65 | 0.66 |
| 18:0 | 11.79 | 11.23 | 8.09 | 8.20 | 8.29 | 8.86 | 7.91 | 8.13 |
| 18:1 C$_5$ | 21.85 | 24.72 | 22.64 | 22.18 | 22.85 | 22.97 | 22.45 | 22.85 |
| 18:1 C$_9$ | 0.49 | — | 0.49 | 0.46 | — | 0.47 | 0.55 | 0.46 |
| 18:1 C$_{11}$ | 0.46 | 0.20 | 0.42 | 0.42 | 0.44 | 0.44 | 0.44 | 0.44 |
| 18:2 T$_{9,12}$ | 0.20 | 0.20 | 0.27 | 0.26 | 0.25 | 0.26 | 0.26 | 0.27 |
| 18:2 C$_{9,12}$ | 2.44 | 2.70 | 2.67 | 2.63 | 2.64 | 2.70 | 2.69 | 2.71 |
| 20:0 | 0.17 | 0.11 | 0.08 | 0.05 | 0.08 | 0.06 | 0.08 | 0.05 |
| 20:1 C$_{11}$ | 0.56 | 0.56 | 0.56 | 0.55 | 0.56 | 0.57 | 0.56 | 0.57 |
| 22:0 | 0.15 | 0.15 | 0.15 | 0.15 | 0.14 | 0.16 | 0.15 | 0.15 |

From the data in Tables 13A, 13B and 14, it will be seen that the process of the present invention was highly effective in removing cholesterol from the butter oil; the oil fractions recovered from the pooled hexane/methylene chloride eluates contained, on a weight/weight basis, only 0.14 percent of the cholesterol in the initial butter oil. Furthermore, the process of the present invention achieved these high levels of cholesterol removal while retaining a high proportion of the original unsaturated fatty acids in the butter oil.

It will also be seen from Table 14 that the process was effective in removing substantial proportions of saturated fatty acids from the butter oil. The oil fraction recovered from the pooled hexane/methylene chloride eluate had a stearic (18:0) acid content which was reduced by more than 30 percent, and an arachidic (20:0) acid content which was reduced by more than 50 percent, as compared with the starting butter oil.

EXAMPLE 6 (Control)

Purification of Refined Fish Oil With Non-Activated Single-Adsorbent Bed Charcoal Column This Example illustrates the purification of refined fish oil using a charcoal column similar to that used in Example 4 above, but in which the charcoal is not activated.

A column was prepared in the same way as in Example 1 above, but containing the following layers (arranged from bottom to top of the column):

(a) Deaerated glass wool pad
(b) 10 mm. layer of anhydrous sodium sulfate
(c) 105 g. of the same charcoal as in Example 4 above, but the charcoal had not been subjected to the activation procedure
(d) 20 mm. layer of anhydrous sodium sulfate
(e) Deaerated glass wool pad.

20.47 G. of the same commercially available refined fish oil as in Example 2 above were placed on top of the column. The column was then eluted with 2 liters of n-hexane, followed by 2 liters of diethyl ether. The eluates in the two solvents were collected as they left the column and distilled at low temperatures to remove the solvents and leave behind the fish oil fractions. Residual traces of solvent in the oil fractions were evaporated on a steam bath under a gentle stream of nitrogen. The hexane and ether derived oil fractions were analyzed for their cholesterol content and fatty acid profiles by packed-column gas chromatography-flame ionization detection and capillary column gas chromatography-flame ionization detection respectively in the same way as in Examples 2 and 4 above. The untreated fish oil was also subjected to the same analyses. The results of the cholesterol analyses are shown in Table 15 below, while the results of the fatty acid analyses are shown in Table 16 below.

TABLE 15

| Eluate | Cholesterol (mg/100 g.) | % Cholesterol Removal |
|---|---|---|
| Untreated oil | 343.4 | 0 |
| Hexane | 29.8 | 91.3 |
| Ether | 32.1 | 90.7 |

TABLE 16

| Acid | Untreated Oil | Hexane Eluate | Ether Eluate |
|---|---|---|---|
| 10:0 | 0.08 | 0.09 | 0.13 |
| 12:0 | 0.03 | 0.04 | 0.05 |
| 14:0 | 8.31 | 8.70 | 10.57 |
| 14:1 | 0.58 | 0.58 | 0.65 |
| 16:0 | 20.81 | 21.06 | 21.23 |
| 16:1 $T_9$ | 0.29 | 0.04 | 0.38 |
| 16:1 $C_9$ | 10.81 | 12.14 | 13.70 |
| 17:0 | 0.46 | 0.43 | 0.40 |
| 18:0 | 3.77 | 3.26 | 2.72 |
| 18:1 | 1.72 | 1.82 | 2.72 |
| 18:1 $C_5$ | 8.46 | 9.27 | 8.62 |
| 18:1 $C_9$ | 3.08 | 3.27 | 3.13 |
| 18:1 $C_{11}$ | 0.09 | 0.09 | 0.09 |
| 18:2 $T_{9,12}$ | 0.20 | 0.20 | 0.22 |
| 18:2 $C_9, T_{12}$ | 0.64 | 0.16 | 0.14 |
| 18:2 $C_{9,12}$ | 1.23 | 1.38 | 0.87 |
| 18:3 $C_{6,9,12}$ | 0.29 | 0.31 | 0.34 |
| 18:3 $C_{9,12,15}$ (W-3) | 2.54 | 2.46 | 2.68 |
| 18:4 9,11,13,15 (W-3) | 0.35 | 0.11 | 0.05 |
| 20:0 | 0.33 | 0.26 | 0.18 |
| 20:1 $C_5$ | 0.55 | 0.57 | 0.59 |
| 20:1 $C_{11}$ | 1.30 | 1.37 | 0.98 |
| 20:2 | 0.22 | 0.21 | 0.17 |
| 20:3 | 0.84 | 0.83 | 0.75 |
| 20:5 (W-3) | 11.27 | 10.65 | 10.31 |
| 22:0 | 0.32 | 0.30 | 0.20 |
| 22:5 (W-3) | 1.80 | 1.64 | 1.23 |
| 22:6 (W-3) | 6.29 | 5.36 | 4.02 |

From the data in Tables 15 and 16, it will be seen that the process using the non-activated charcoal was substantially less effective in removing cholesterol from the fish oil than the process of the present invention, removing only about 91 percent of the cholesterol in the original oil, as compared with about 99 percent removal achieved in Examples 2 and 4 above. Furthermore, the process using the non-activated charcoal only achieved approximately the same level of retention of the desirable omega-3 polyunsaturated fatty acids as was achieved by the process of the present invention in Examples 2 and 4 above, despite the fact that the latter achieved far better cholesterol removal. Finally, the non-activated charcoal did not substantially reduce the levels of saturated fatty acids in the oil, as shown especially by the levels of 16:0 and 18:0 in the treated oil.

EXAMPLE 7 (Control)

Purification of Butter Oil With Non-Activated Single-Adsorbent Bed Charcoal Column This Example illustrates the purification of oil using a charcoal column similar to that used in Example 6 above, in which the charcoal is not activated.

A column identical to that used in Example 6 above was prepared and used to treat a 15.2 g. sample of butter oil prepared as in Examples 3 and 5 above. Elution was effected using 1.5 l. of n-hexane, followed by 1.5 l. of diethyl ether. The eluates were anlayzed in the same manner as in Example 6 above, and the results are given in Tables 17 and 18 below.

TABLE 17

| Eluate | Cholesterol (mg/100 g.) | % Cholesterol Removal |
|---|---|---|
| Untreated oil | 278.2 | 0 |
| Hexane | 11.1 | 96.0 |
| Ether | 118.3 | 57.5 |

TABLE 18

| Acid | Untreated Oil | Hexane Eluate | Ether Eluate |
|---|---|---|---|
| 8:0 | 0.96 | 0.99 | 1.23 |
| 10:0 | 2.62 | 2.72 | 3.20 |
| 12:0 | 3.54 | 3.53 | 4.18 |
| 14:0 | 11.58 | 11.61 | 13.21 |
| 14:1 $C_9$ | 1.31 | 1.24 | 1.37 |
| 16:0 | 31.45 | 31.19 | 33.85 |
| 16:1 $T_9$ | 0.46 | 0.43 | 0.43 |
| 16:1 $C_9$ | 2.05 | 2.05 | 2.09 |
| 17:0 | 0.81 | 0.77 | 0.80 |
| 18:0 | 11.58 | 10.68 | 9.23 |
| 18:1 $C_5$ | 22.26 | 23.56 | 20.42 |
| 18:1 $C_9$ | 0.73 | 0.41 | 0.17 |
| 18:1 $C_{11}$ | 0.44 | 0.41 | 0.30 |
| 18:2 $T_{9,12}$ | 0.16 | 0.20 | 0.22 |
| 18:2 $C_{9,12}$ | 2.89 | 2.84 | 2.31 |
| 20:0 | 0.16 | 0.13 | 0.08 |
| 20:1 $C_{11}$ | 0.45 | 0.39 | 0.30 |
| 22:0 | 0.19 | 0.15 | 0.06 |

From the data in Tables 17 and 18, it will be seen that the process using the non-activated charcoal was substantially less effective in removing cholesterol from the butter oil than the process of the present invention, removing only about 96 percent of the cholesterol in the original oil, as compared with better than 99 percent removal achieved in Example 3 above. Furthermore, the process using the non-activated charcoal achieved only 7.77% reduction in 18:0 (stearic) acid, and only 18.75% reduction in 20:0 (arachidic) acid, reductions substantially less than those achieved in the corresponding process of the invention using activated charcoal described in Example 3 above, despite the fact that the process of the present invention achieved far better cholesterol removal.

EXAMPLE 8 (Control)

Purification of Refined Fish Oil With Non-Activated Single Adsorbent Bed Charcoal Column This Example illustrates the purification of refined fish oil using a charcoal column similar to that used in Example 4 above, but in which the charcoal is not activated and the oil/adsorbent ratio is lower than that in Example 4.

Six separate columns were prepared using the same technique as in Example 1 above, except that the silica gel layers were omitted, so that the sole active layer of each column comprised 30 g. of charcoal. To each column was added 3 g. of the same commercially available refined fish oil as in Example 2. The column was then eluted with the following solvents in the order specified:
(a) n-Hexane (500 ml.)
(b) Diethyl ether (500 ml.)
(c) Methylene chloride (500 ml.)
(d) Anhydrous methanol (500 ml.).

The four eluate fractions were collected as they left the columns. Thus, the six columns yielded a total of 24 eluate fractions. Each of these fractions was distilled at low temperatures to remove the solvents and leave behind the fish oil fractions. Residual traces of solvent in the oil fractions were evaporated on a steam bath under a gentle stream of nitrogen, and thereafter the oil fractions were weighted. The oil fractions were analyzed for their cholesterol content and fatty acid profiles by packed-column gas chromatography-flame ionization detection and capillary column gas chromatography-flame ionization detection respectively in the same way as in Examples 2 and 4 above. The untreated fish oil was also subjected to the same analyses. The yields of oil and the results of the cholesterol analyses are shown in Table 19 below, while the results of the fatty acid analyses are shown in Table 20 below; in each case, the values given are the averages of the six samples from the different columns.

TABLE 19

| Eluate | % Yield | % Cholesterol Removal | Precision |
|---|---|---|---|
| Hexane | 45.33 | 91.3 | 1.30 |
| Ether | 4.40 | 91.86 | 2.42 |
| Methylene chloride | 27.17 | 91.84 | 2.47 |
| Methanol | 1.10 | 74.50 | |

TABLE 20

| Acid | Untreated Oil | Oil fractions derived from: | | | |
|---|---|---|---|---|---|
| | | Hexane | Ether | $Ch_2Cl_2$ | Methanol |
| 12:0 | 0.08 | 0.09 | 0.14 | 0.07 | 0.07 |
| 14:0 | 7.99 | 8.66 | 10.54 | 8.29 | 7.89 |
| 14:1 | 0.56 | 0.56 | 0.71 | 0.61 | 0.59 |
| 16:0 | 21.45 | 20.80 | 20.35 | 24.43 | 24.37 |
| 16:1 $T_9$ | 0.29 | 0.32 | 0.36 | 0.26 | 0.27 |
| 16:1 $C_9$ | 10.58 | 13.20 | 15.64 | 9.52 | 10.60 |
| 17:0 | 0.47 | 0.43 | 0.32 | 0.54 | 0.51 |
| 18:0 | 3.88 | 3.28 | 2.55 | 4.54 | 4.73 |
| 18:1 $T_9$ | 1.67 | 1.77 | 2.45 | 1.34 | 1.49 |
| 18:1 $C_5$ | 8.57 | 10.11 | 9.54 | 8.60 | 9.34 |
| 18:1 $C_9$ | 3.11 | 3.55 | 3.46 | 3.19 | 3.41 |
| 18:1 $C_{11}$ | 0.11 | 0.10 | — | 0.10 | — |
| 18:2 $T_{9,12}$ | 0.21 | 0.14 | 0.29 | 0.15 | 0.18 |
| 18:2 $C_9, T_{12}$ | 0.17 | 0.16 | 0.15 | 0.14 | 0.12 |
| 18:2 $C_{9,12}$ | 1.94 | 2.02 | 2.29 | 1.81 | 1.75 |
| 18:3 $C_{6,9,12}$ | 0.30 | 0.31 | 0.28 | 0.27 | 0.22 |
| 18:3 $C_{9,12,15}$ (W-3) | 2.51 | 2.28 | 2.86 | 2.44 | 2.50 |
| 18:4 9,11,13,15 (W-3) | 0.16 | 0.10 | — | 0.14 | 0.19 |
| 20:0 | 0.36 | 0.29 | — | 0.38 | 0.39 |
| 20:1 $C_5$ | 0.58 | 0.62 | 0.65 | 0.54 | 0.55 |
| 20:1 $C_{11}$ | 1.37 | 1.51 | 1.04 | 1.44 | 1.53 |
| 20:2 | 0.21 | 0.20 | 0.19 | 0.20 | 0.18 |
| 20:3 | 0.81 | 0.79 | 0.72 | 0.71 | 0.69 |
| 20:5 (W-3) | 11.37 | 9.85 | 10.79 | 11.32 | 11.19 |
| 22:0 | 1.18 | 1.03 | 0.98 | 1.20 | 1.14 |
| 22:5 (W-3) | 1.84 | 1.52 | 1.23 | 2.01 | 1.94 |
| 22:6 (W-3) | 5.77 | 3.54 | 2.95 | 5.54 | 6.0 |

From the data in Tables 19 and 20, it will be seen that the process using the non-activated charcoal was substantially less effective in removing cholesterol from the fish oil than the process of the present invention, removing only about 91 percent of the cholesterol in the original oil, as compared with about 99 percent removal achieved in Examples 2 and 4 above. Furthermore, the process using the non-activated charcoal only achieved approximately the same level of retention of the desirable omega-3 polyunsaturated fatty acids as was achieved by the process of the present invention in Examples 2 and 4 above, despite the fact that the latter achieved far better cholesterol removal. Finally, the process using the non-activated charcoal achieved less removal of stearic and arachidic fatty acids than the process of the present invention.

EXAMPLE 9 (Control)

Purification of Butter Oil With Non-Activated Single-Adsorbent Bed Charcoal Column This Example illustrates the purification of butter oil using a charcoal column similar to that used in Example 5 above, but in which the charcoal is not activated.

Six columns were prepared in the same manner as in Example 8 above, except that the columns each contained only 25 g. of charcoal. A 3 g. sample of butter oil prepared in the same manner as in Examples 3, 5 and 7 above was then added to each column and each column was eluted with 500 ml. of n-hexane. Thereafter, only three of the columns were further eluted 500 ml. portions of diethyl ether. The resulting 9 eluates were analyzed in the same manner as in Example 8 above, and the results are shown in Tables 21 and 22 below; not that, unlike Table 19 above, Table 21 gives results for the oil fractions from each of the eluates, not just averages for each solvent, whereas Table 22 only gives averages for each solvent.

TABLE 21

| Oil Fraction | Cholesterol (mg/100 g.) | % Cholesterol Removal |
|---|---|---|
| Untreated oil | 255.2 | 0 |
| n-Hexane fractions | | |
| No. 1 column | 0.5 | 99.8 |
| No. 2 column | 1.1 | 99.6 |
| No. 3 column | 0.5 | 99.8 |
| No. 4 column | 6.1 | 97.6 |
| No. 5 column | 3.4 | 98.7 |
| No. 6 column | 1.4 | 99.5 |
| Mean | | 99.2 |
| Standard Deviation | | 0.869 |
| Precision | | 0.876 |
| Variance | | 0.755 |
| Average Recovery of Decholesterized Oil | | 52.00% |
| Diethyl either fractions | | |
| No. 1 column | Not detected | 100 |
| No. 2 column | Not detected | 100 |
| No. 3 column | Not detected | 100 |
| Average Recovery of Decholesterized Oil | | 7.4% |

TABLE 22

| Acid | Untreated Oil | Oil fractions derived from: | |
|---|---|---|---|
| | | Hexane | Ether |
| 4:0 | 1.33 | 1.20 | 2.02 |
| 6:0 | 0.83 | 0.93 | 1.22 |
| 8:0 | 0.71 | 0.77 | 0.96 |
| 10:0 | 2.27 | 2.25 | 2.55 |
| 12:0 | 2.91 | 3.16 | 3.47 |
| 14:0 | 10.49 | 11.09 | 12.07 |
| 14:1 $C_9$ | 1.16 | 1.18 | 1.28 |
| 16:0 | 29.63 | 29.12 | 31.52 |
| 16:1 $T_9$ | 0.44 | 0.48 | 0.43 |
| 16:1 $C_9$ | 1.96 | 2.22 | 2.03 |
| 17:0 | 0.74 | 0.68 | 0.76 |
| 18:0 | 11.85 | 9.94 | 9.29 |
| 18:1 $C_5$ | 22.17 | 23.73 | 19.80 |
| 18:1 $C_9$ | 0.53 | 0.54 | 0.49 |
| 18:1 $C_{11}$ | 0.42 | 0.34 | 0.36 |
| 18:2 $T_{9,12}$ | 0.18 | 0.19 | 0.18 |
| 18:2 $C_{9,12}$ | 2.06 | 2.03 | 1.41 |
| 20:0 | 0.18 | 0.11 | 0.09 |
| 20:1 $C_{11}$ | 0.64 | 0.59 | 0.31 |
| 22:0 | 0.14 | 0.11 | — |

From the data in Tables 21 and 22, it will be seen that the process using the non-activated charcoal was less effective in removing cholesterol from the butter oil than the process of the present invention. Furthermore, the process using the non-activated charcoal achieved less removal of stearic and arachidic fatty acids, despite the fact that the process of the present invention achieved better cholesterol removal.

EXAMPLE 10

Removal of Sterol Compounds From Supercritical Carbon Dioxide

This Example illustrates schematically the way in which the present process could be used to remove sterol compounds from supercritical carbon dioxide, which has itself been used to extract sterol compounds from a foodstuff.

The apparatus used in this process is shown in a highly schematic manner in the accompanying drawing. In this drawing, the foodstuff to be treated is placed in a vessel 10 provided with an inlet line 12 and an outlet line 14. Supercritical carbon dioxide is pumped by means of a pump 16 from the inlet line 12 through the vessel 10 and into the outlet line 14.

In practice, as for example when the treatment of the foodstuff is effected in the manner described in the aforementioned U.S. Pat. No. 4,692,280, the apparatus used to contact the carbon dioxide with the foodstuff may be considerably more complicated than a simple vessel 10 and may include numerous interconnected vessels, lines, etc. However, in so far as the modification of such a process effected by the present invention is concerned, any process for treatment of a foodstuff with supercritical carbon dioxide may conceptually be regarded as taking place in a closed vessel which receives "clean" carbon dioxide at an inlet and expels sterol-laden carbon dioxide at an outlet.

The outlet line 14 is connected to a two-way valve 18, which has outlets connected via lines 20 and 22 to recovery vessels 24 and 26 respectively, these vessels both being filled with activated charcoal produced in Example 1 above. These vessels 24 and 26 each have an outlet connected via a line 28 or 30 to the inlet of the pump 16.

To make up the inevitable small losses of carbon dioxide, the apparatus is provided with a carbon dioxide reservoir 32, which is connected via a valve 34 to the line 12.

A reservoir 36 is connected via a line 38 provided with a pump 40 to a two-way valve 42, the outlets of which are connected via lines 44 and 46 to the recovery vessels 24 and 26 respectively. The reservoir 36 can be supplied with solvents from any one of four solvent tanks 48, 50, 52 and 54, flow of solvent from these solvent tanks to the reservoir 36 being controlled by valves 56, 58, 60 and 62 respectively.

The recovery vessels have outlets connected via lines 64 and 66 respectively, provided with check valves 68 and 70 respectively, to a waste solvent collection vessel 72.

The apparatus shown in the drawing is used in the following manner. The foodstuff to be treated is placed in the vessel 10 and supercritical carbon dioxide is circulated through the foodstuff by means of the pump 16. Sterol-laden carbon dioxide leaves the vessel 10 via the outlet line 14, and when this sterol-laden carbon dioxide reaches the valve 18, it is initially routed via the line 20 to the recovery vessel 24. As the carbon dioxide passes through the vessel 24, most of the sterol compounds in the carbon dioxide are adsorbed by the activated charcoal in the vessel 24, so that substantially sterol-free carbon dioxide leaves the vessel 24 via the line 28, and is recirculated by the pump 16 back to the vessel 10.

This process continues (in normal practice, with occasional replacement of the foodstuff in the vessel 10 with further batches of foodstuff) until the activated charcoal in the vessel 24 is laden with almost its maximum amount of sterol compounds and/or fatty acids. At this time, the valve 18 is shifted to its other position, so that sterol-laden carbon dioxide from the line 14 is routed via the line 22, the recovery vessel 26 (where most of the sterol compounds and/or saturated fatty acids are removed), the line 30 and the pump 16 back to the vessel 10.

To remove the sterol compounds and/or saturated fatty acids from the activated charcoal in the vessel 24 and thus prepare the charcoal for reuse, the solvent tanks 48, 50, 52 and 54 are loaded with the following solvents:

Tank 48:
    10% by volume cyclohexanol
    20% by volume acetic acid
    70% by volume ethanol
Tank 50: Ethyl acetate
Tank 52: Methylene chloride
Tank 54: Hexane.

The vessel 36 is first filled with the mixture from tank 48, and this mixture is pumped by the pump 40 along the line 38 to the valve 42, which is set to route the mixture along the line 44 to the recovery vessel 24. The mixture desorbs the sterol compounds and saturated fatty acids from the activated charcoal in the vessel 24, and the resulting sterol and fatty acid-laden solvent passes along the line 64, though the check valve 68 and into the waste reservoir 72. (Obviously, if a highly inflammable solvent is used for the desorption, appropriate precautions should be taken to ensure that the solvent in the reservoir 72 does not ignite.) The check valve 70 serves to prevent back-flow of the solvent mixture into the recovery vessel 26. If desired, the sterol and fatty acid-laden solvent in the reservoir 72 may be distilled or otherwise treated to remove the sterol compounds and fatty acids therefrom, thereby permitting reuse of the solvent mixture.

Once treatment of the charcoal in the vessel with the solvent mixture from the tank 48 has been completed, the vessel 36 is filled with ethyl acetate from the tank 50, and this ethyl acetate is passed in the same manner through the charcoal in the vessel 24. Thereafter, the charcoal in the vessel 24 is treated successively with methylene chloride from the tank 52 and hexane from the tank 54. Following the four washings, the charcoal in the vessel 24 is fully regenerated and ready for reuse. (It will be apparent to those skilled in the art that, if recovery of the washing solvents is desired for economic reasons, the single reservoir 72 may advantageously be replaced by a series of four reservoirs and a multi-way valve, or series of valves, to ensure that the different washing solvents used are each directed to a separate reservoir, thus facilitating the recovery of the various solvents.)

When the activated charcoal in the vessel 26 becomes laden with almost its maximum amount of sterol compounds and/or fatty acids, the valve 18 is again shifted to route the carbon dioxide from the line 14 to the vessel 24, and the valve 42 is shifted to its other position, so that the charcoal in the vessel 26 can be washed with the various solvents from the tanks 48, 50, 52 and 54 to desorb the sterol compounds and fatty acids from the activated charcoal in that vessel, thus regenerating the charcoal for reuse, in the same manner as already described for the vessel 24.

From the foregoing, it will be seen that the apparatus shown in the drawing allows continuous extraction of sterol compounds (and saturated fatty acids) from foodstuffs using supercritical carbon dioxide without the need for evaporation and recondensation of the carbon dioxide between passes through the foodstuff. Accordingly, the process of the present invention just described with reference to the drawing incurs much lower energy costs than conventional processes employing supercritical carbon dioxide to remove sterol compounds from foodstuffs.

A process generally similar to that of the present invention, but in which the activated charcoal is used to treat a fluid mixture containing a sterol compound and, optionally, an unsaturated fatty acid, with removal of the sterol compound without any substantial removal of the unsaturated fatty acid from the fluid mixture, is described and claimed in an application filed on the same day as the present application, by the present inventors, and entitled "Process for the removal of sterol compounds".

We claim:

1. A process for the removal of at least one sterol compound and at least one saturated fatty acid from a fluid, which process comprises contacting the fluid with an activated charcoal, the activated charcoal having been produced by heating charcoal to a temperature of about 110° C. to about 150° C. for a period of at least about 12 hours.

2. A process according to claim 1 wherein the activated charcoal has been produced by heating charcoal to a temperature of at least about 125° C. for a period of at least about 24 hours.

3. A process according to claim 2 wherein the activated charcoal has been produced by heating charcoal to a temperature of from about 125° C. to about 150° C. for a period of at least about 24 hours.

4. A process according to claim 1 wherein the activated charcoal has been produced by heating charcoal in an oxygen-containing gas.

5. A process according to claim 4 wherein, during the heating of the charcoal, blower means were arranged to force passage of the oxygen-containing gas over the charcoal.

6. A process according to claim 1 wherein the activated charcoal has been produced by heating charcoal to a temperature of from about 125° C. to about 150° C. for a period of at least about 24 hours while a stream of an oxygen-containing gas is forced over the charcoal.

7. A process according to claim 1 wherein the fluid comprises at least one oil or fat of animal origin.

8. A process according to claim 7 wherein the fluid comprises at least one dairy fat.

9. A process according to claim 8 wherein the fluid comprises butter oil.

10. A process according to claim 1 which removes at least about 10 percent by weight of the saturated fatty acid in the fluid based on the weight of the saturated fatty acid.

11. A process according to claim 10 which removes at least about 30 percent by weight of the saturated fatty acid in the fluid based on the weight of the saturated fatty acid.

12. A process according to claim 1 wherein the fatty acid present in the fluid comprises stearic acid.

13. A process according to claim 12 which removes at least about 30 percent by weight of the stearic acid in the fluid based on the weight of the stearic acid.

14. A process according to claim 13 wherein the oil or fat further comprises at least one saturated fatty acid and the process is carried out so that at least about 80 percent by weight of the unsaturated fatty acid remains in the fluid based on the weight of the unsaturated fatty acid.

15. A process according to claim 7 wherein the oil or fat further comprises at least one unsaturated fatty acid and the process is carried out so that at least about 80 percent by weight of the unsaturated fatty acid remains in the fluid.

16. A process according to claim 15 wherein the oil or fat comprises a fish oil containing at least one omega-3 fatty acid.

17. A process according to claim 16 wherein the process removes at least about 90 percent by weight of the sterol compounds present in the original fish oil, but leaves at least about 90 percent by weight of the omega-3 fatty acids in the fish oil.

18. A process according to claim 17 which removes at least about 30 percent by weight of the stearic acid in the fish oil.

19. A process according to claim 1 wherein the fluid comprises a solution of at least one oil or fat of animal origin in a non-polar solvent.

20. A process according to claim 19 wherein the non-polar solvent is an alkane.

21. A process according to claim 20 wherein the alkane is hexane.

22. A process according to claim 7 wherein the animal fat or oil becomes adsorbed on the charcoal and is thereafter desorbed from the charcoal by contacting the charcoal with a semi-polar solvent.

23. A process according to claim 22 wherein the semi-polar solvent is a halogenated alkane.

24. A process according to claim 23 wherein the halogenated alkane is methylene chloride.

25. A process according to claim 1 wherein the fluid comprises a solvent which has been contacted with a sterol-containing foodstuff.

26. A process according to claim 25 wherein the solvent comprises liquid or supercritical carbon dioxide.

27. A process for the removal from a fluid containing at least one sterol compound, at least one saturated fatty acid and at least one unsaturated fatty acid, of major proportion of the sterol compounds and part of the saturated fatty acid without removal of a major proportion of the unsaturated fatty acid, which process comprises contacting the fluid with an activated charcoal, the activated charcoal having been produced by heating charcoal to a temperature of about 110° C. to about 150° C. for a period of at least about 12 hours.

28. A process according to claim 27 which is carried out so that at least about 80 percent by weight of the unsaturated fatty acid remains in the fluid.

29. A process according to claim 28 which is carried out so that at least about 10 percent by weight of the saturated fatty acid is removed from the fluid.

30. A process according to claim 29 which is carried out so that at least about 30 percent by weight of the saturated fatty acid is removed from the fluid.

31. A process according to claim 27 wherein the oil or fat comprises a fish oil containing at least one omega-3 fatty acid.

32. A process according to claim 31 wherein the process removes at least about 90 percent by weight of the sterol compounds present in the original fish oil, and at least about 10 percent by weight of the saturated fatty acids present in the fish oil, but leaves at least about 90 percent by weight of the omega-3 fatty acids in the fish oil.

33. A process according to claim 27 wherein the activated charcoal has been produced by heating charcoal to a temperature of at least about 125° C. for a period of at least about 24 hours.

34. A process according to claim 33 wherein the activated charcoal has been produced by heating charcoal to a temperature of from about 125° C. to about 150° C. for a period of at least about 24 hours.

35. A process according to claim 27 wherein the activated charcoal has been produced by heating charcoal in an oxygen-containing gas.

36. A process according to claim 35 wherein, during the heating of the charcoal, blower means were arranged to force passage of the oxygen-containing gas over the charcoal.

37. A process according to claim 27 wherein the activated charcoal has been produced by heating charcoal to a temperature of from about 125° C. to about 150° C. for a period of at least about 24 hours while a stream of an oxygen-containing gas is forced over the charcoal.

38. A process according to claim 27 wherein the fluid comprises a solution of at least one oil or fat of animal origin in a non-polar solvent.

39. A process according to claim 38 wherein the non-polar solvent is an alkane.

40. A process according to claim 39 wherein the alkane is hexane.

41. A process according to claim 38 wherein the animal fat or oil becomes adsorbed on the charcoal and is thereafter desorbed from the charcoal by contacting the charcoal with a semi-polar solvent.

42. A process according to claim 41 wherein the semi-polar solvent is a halogenated alkane.

43. A process according to claim 42 wherein the halogenated alkane is methylene chloride.

* * * * *